United States Patent [19]

Dow

[11] Patent Number: 5,176,573
[45] Date of Patent: Jan. 5, 1993

[54] CORN HARVESTING

[75] Inventor: Paul W. Dow, Byron, N.Y.

[73] Assignee: Byron Enterprises, Inc., Byron, N.Y.

[21] Appl. No.: 748,573

[22] Filed: Aug. 22, 1991

[51] Int. Cl.⁵ .............................................. A01F 11/06
[52] U.S. Cl. ...................................... 460/42; 460/48; 460/119
[58] Field of Search ............... 460/29, 42, 48, 45, 460/119; 56/103, 105

[56] References Cited

U.S. PATENT DOCUMENTS

| | | |
|---|---|---|
| 2,277,855 | 3/1942 | Mercier . |
| 2,373,316 | 4/1945 | Landy . |
| 2,466,386 | 4/1949 | Curioni . |
| 2,704,078 | 3/1971 | Scranton . |
| 2,845,251 | 7/1958 | Barton et al. . |
| 2,860,715 | 11/1958 | Bouffort . |
| 2,935,834 | 5/1960 | Vaughn . |
| 3,339,710 | 9/1967 | Micgielse . |
| 3,362,298 | 11/1967 | Julow . |
| 3,423,910 | 1/1969 | Shimamoto . |
| 3,478,863 | 11/1969 | Fuchs . |
| 3,503,196 | 3/1970 | Jarrett . |
| 3,548,575 | 12/1970 | Lane . |
| 3,605,983 | 9/1971 | Oldershaw . |
| 3,628,316 | 12/1971 | Rea ............................... 56/13.3 |
| 3,669,240 | 6/1972 | Ross ........................... 198/31 AA |
| 3,772,861 | 11/1973 | Gunyou et al. ................... 460/29 X |
| 3,791,114 | 2/1974 | Fowler ............................ 56/13.9 |
| 3,942,307 | 3/1976 | Quick ............................ 56/13.9 |
| 4,137,695 | 2/1979 | Sammann ..................... 56/106 X |
| 4,225,031 | 9/1980 | Frisbie et al. .................... 198/395 |
| 4,226,293 | 10/1980 | Bieker ............................ 180/9.5 |

(List continued on next page.)

FOREIGN PATENT DOCUMENTS

| | | |
|---|---|---|
| 1461287 | 12/1968 | Fed. Rep. of Germany . |
| 287446 | 10/1974 | U.S.S.R. . |
| 1082768 | 9/1967 | United Kingdom . |

OTHER PUBLICATIONS

Computer Controlled Machines of Minnesota, U.S.A., Inc. "Automatic Corn Oriener Cutter Feeder and Benefits of the CCM AKS-7400 System" (1985).

*Primary Examiner*—Terry Lee Melius
*Attorney, Agent, or Firm*—Martin Lukacher

[57] ABSTRACT

A corn harvesting system integrates automatic separation and removal of ears of corn from a plurality of rows of corn plants (the stalks thereof), the husking of the ears, the cutting or the kernels and the deposit thereof into a container from which the kernels can be removed for canning or other processing. A tracked vehicle has a structure on which mechanisms for corn ear from stalk separation (picking), husking, kernel cutting and conveying ears between the picking, husking, cutting and a cut kernel container are arranged on two levels or stories and is of height, length and width so as to be capable of being self-propelled through the fields and carried on a flat bed truck or trailer between fields on roads without special permits or routing to make bridge and tunnel clearances. The system has mechanisms for the ejection of stalks, husks and cobs directly on the field. The kernel cutting and husking mechanisms are so arranged that "green" ears or ears blocked by jams in any cutting mechanism can be recycled via the husking machine and associated conveyors so as to avoid stopping harvesting operations. The ear separation husking and cutting mechanisms are arranged and allocated in groups each to a different row of stalks so that the load (the rate of corn ears presented for cutting to the kernel cutting machines) is distributed in accordance with the density of planting (which is generally uniform), the rate at which the corn is harvested and the rate at which kernels are delivered to the container being controllable by controlling the speed of travel of the harvester through the field. This system enables kernels of sweet corn to be harvested without stressing the environment, because cobs, husks, stalks, etc. remain on the field and do not become waste requiring disposal by sewage treatment, burning or landfilling.

40 Claims, 15 Drawing Sheets

U.S. PATENT DOCUMENTS

| | | | |
|---|---|---|---|
| 4,325,443 | 4/1982 | Fisher | 180/9.44 |
| 4,413,722 | 11/1983 | Frisbie | 198/392 |
| 4,474,188 | 10/1984 | Kashino | 56/14.6 |
| 4,497,162 | 2/1985 | Eguchi | 56/14.6 |
| 4,500,139 | 2/1985 | Tucek | 305/10 |
| 4,583,354 | 4/1986 | Kracl | 56/14.6 X |
| 4,607,703 | 8/1986 | Wang | 171/1 |
| 4,781,257 | 11/1988 | Gee et al. | 180/9.5 |
| 4,834,478 | 5/1989 | Stevens et al. | 305/21 |
| 4,836,318 | 6/1989 | Tonsor et al. | 180/9.5 |
| 4,838,373 | 6/1989 | Price et al. | 180/9.46 |
| 4,845,930 | 7/1989 | Dow | 56/113 |
| 4,874,052 | 10/1989 | Purcell et al. | 180/9.1 |
| 4,893,883 | 1/1990 | Satzler | 305/10 |
| 4,999,983 | 3/1991 | Britt et al. | 56/107 |

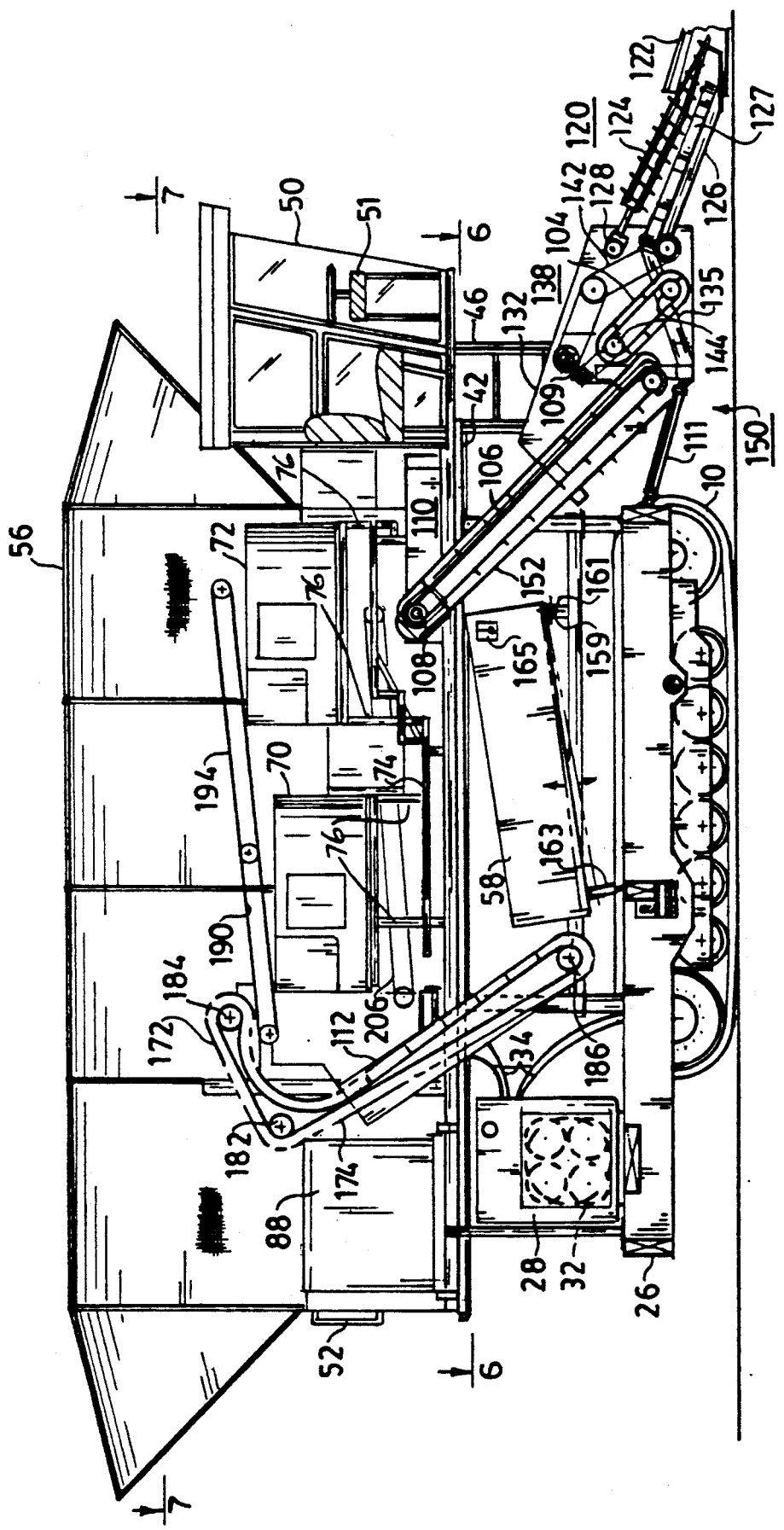

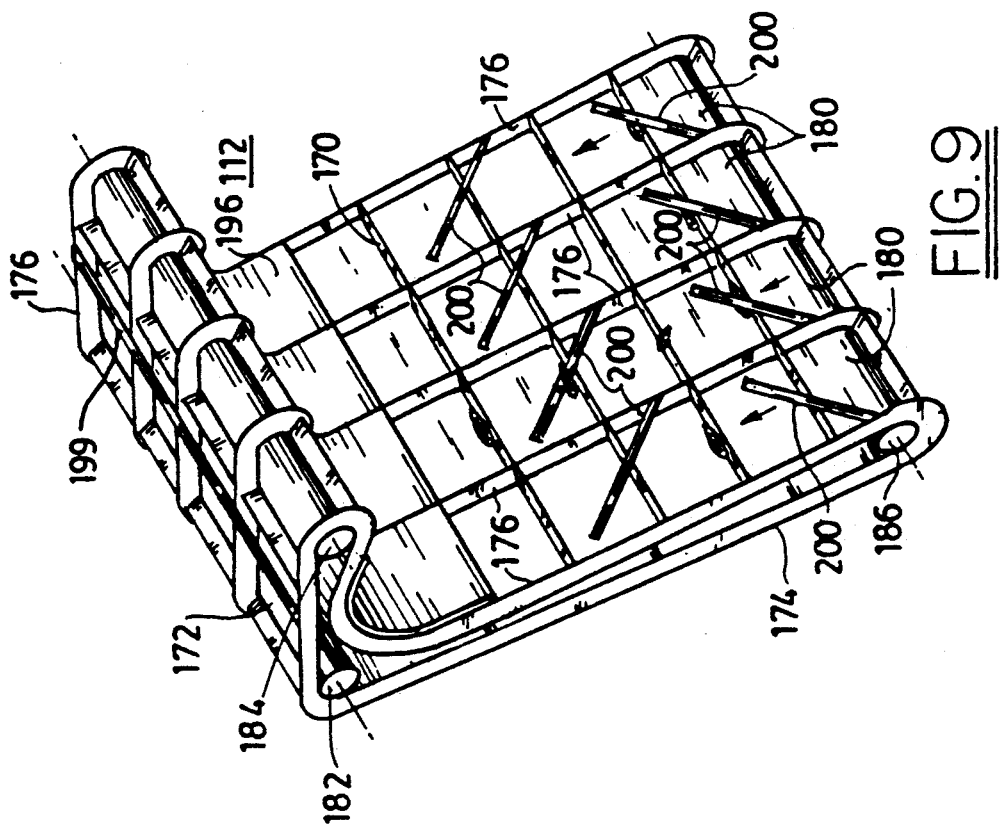
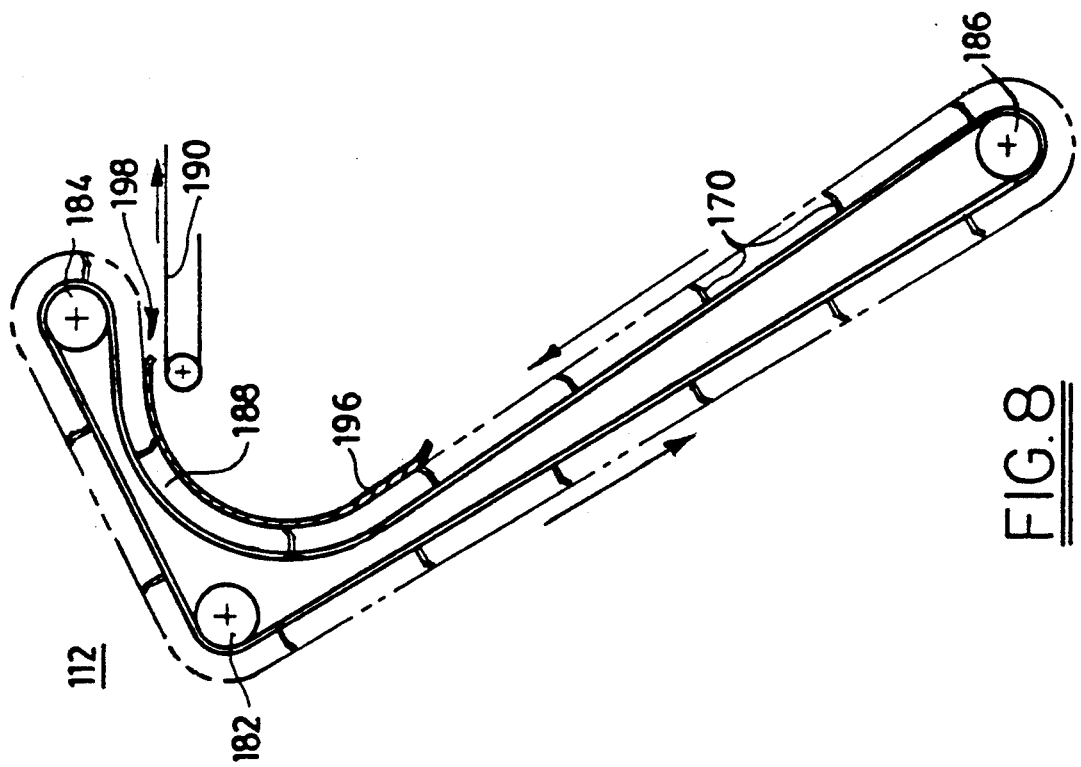

CORN HARVESTING

DESCRIPTION

The present invention relates to systems (methods and apparatus) for the harvesting of sweet corn, and particularly to an integrated system adapted to be provided on a single self-propelled vehicle for harvesting kernels of sweet corn while returning the cobs, husks and any cut stalks back to the field, where they can be recovered as silage or Plowed under for soil conditioning.

The present invention is especially suitable for providing a sweet corn kernel harvesting machine having a head for picking ears of corn from the stalks in a plurality (e.g., four) rows growing in a field, a husking bed, corn kernel cutting mechanisms and conveyors for ears and kernels and for the recycling of green ears and other ears, which need to be diverted from the cutting mechanisms, are recycled to the husking bed, which carries all of the foregoing and other components thereof, within spatial perimeters (height, length and width) and so as to have a total weight such that the machine can be self-propelled through the field and can be carried on a flat bed trailer allowing sufficient clearance to travel on public roads between fields without requiring special routes and permits because of weight and height restrictions applicable to vehicles traveling along such roads. The invention and various elements thereof may find application wherever environmental protection considerations similar to those confronting sweet corn processing and requirements for portability and for size exist.

The harvesting of sweet corn imposes particularly stringent requirements in order to protect the harvested corn from damage, since piercing, bruising and other damage to kernels prevents the sweet corn from being acceptable to consumers. While field corn, where the kernels are hard, can be harvested in the field by scraping the kernels from the cob, sweet corn is generally harvested as ears contained in their protective husks. The husks are removed and the kernels are cut in the processing plant. The disposal of the husks and cobs, particularly under present-day environmental protection laws and regulations, is difficult and expensive. It is far more desirable to leave the husks and cobs and any remnant stalks in the field where they can be recovered for silage or plowed under so as to condition the soil for subsequent plantings.

It is the principal object of the present invention to provide an improved system for integrating all of the harvesting operations up to and including the separation of the kernels so that mechanisms for carrying out these operations can be provided in a single harvesting machine.

It is a further object of the invention to provide an integrated system for sweet corn harvesting, from ear picking to kernel cutting and delivery, in which damage to the kernels is minimized.

It is a still further object of the present invention to provide an improved system for sweet corn harvesting in which all facilities from ear picking through kernel cutting and delivery are arranged within a volume of space, the perimeter of which is sufficiently small and the weight of which is sufficiently low so that the system can be embodied in a self-propelled machine which can be transported over roads and highways, between fields without special procedures to comply with highway vehicle size and weight restrictions.

It is a still further object of the present invention to Provide an improved integrated sweet corn harvesting system wherein the waste products of harvesting (husks, cobs, remnant stalks, etc.) are left on the field thereby eliminating the need for special procedures, consistent with environmental protection rules and regulations, for the disposal thereof.

The system provided by the present invention makes use of a corn head which picks ears of corn from a plurality (e.g., four) rows of corn plants (the stalks thereof) at the same time. It also makes use of a husking bed having parallel husking rolls to which ears are delivered from the corn head. The system in its presently preferred embodiment, uses commercially available kernel cutting machines (see U.S. Pat. Nos. 4,225,031 issued Sep. 30, 1980 and 4,413,722 issued Nov. 8, 1983 for further information on such machines). The corn head, husking bed and a structure for supporting and carrying same on a tracked undercarriage are all integrated in a manner to accomplish the objects of the invention, thereby providing a unique and practical solution to the problems which have heretofore prevented sweet corn cob harvesting of kernels directly in the field.

Briefly described, the system of the invention enables the harvesting of kernels of corn on ears growing on stalks planted in parallel rows in a field while ejecting husks, cobs and stalks on to the field where they can be plowed under into the ground to condition the soil of the field or removed for silage, etc. The system operates singularly for ears growing in each of a plurality of the rows, and for all of the rows at the same time, to remove the ears from the stalks, the husks from the ears and the kernels on each of the ears to leave cobs so that the ears are distributed for kernel removal at a rate corresponding to the yield of corn from each of the rows. This arrangement is called "singulation". The system operates to collect the kernels from all of the rows after removal of the ears and to return the husks, cobs and any remnant stalks to the field during the removing operations. The system is preferably embodied in a single integrated and self-propelled machine which may be mounted on a tracked undercarriage and arranges mechanisms for cutting the kernels on an upper story and the husking bed on a lower story of a structure carried by the undercarriage. The structure also carries an assembly including the corn head at the forward end of the machine. A container for cut kernels is located, preferably at the rear end of the machine. A system of conveyors maintains singulation between the rows of corn plants (stalks) and the cutting machines so that the load on the machine is distributed in accordance with the density of planting (which is generally very uniform). The speed of harvesting can be controlled by varying the speed of travel of the machine over the field. The total height of the machine may be such that, when placed on a standard flat bed (e.g. 20" road clearance), the height of the machine is within restrictions for vehicles traveling over roads and highways, thereby avoiding the need to obtain special permits or to follow special routes which do not have restricted clearances for bridges, overpasses and the like.

The foregoing and other objects, features and advantages of the invention, as well as a presently preferred embodiment thereof, will become more apparent from reading of the following description in connection with the accompanying drawings in which:

FIG. 5 is a view similar to FIG. 1 showing mechanisms of the corn head and the vertical elevator for carrying ears of husked corn between the lower and upper stories of the machine, in greater detail;

Figure 8B:
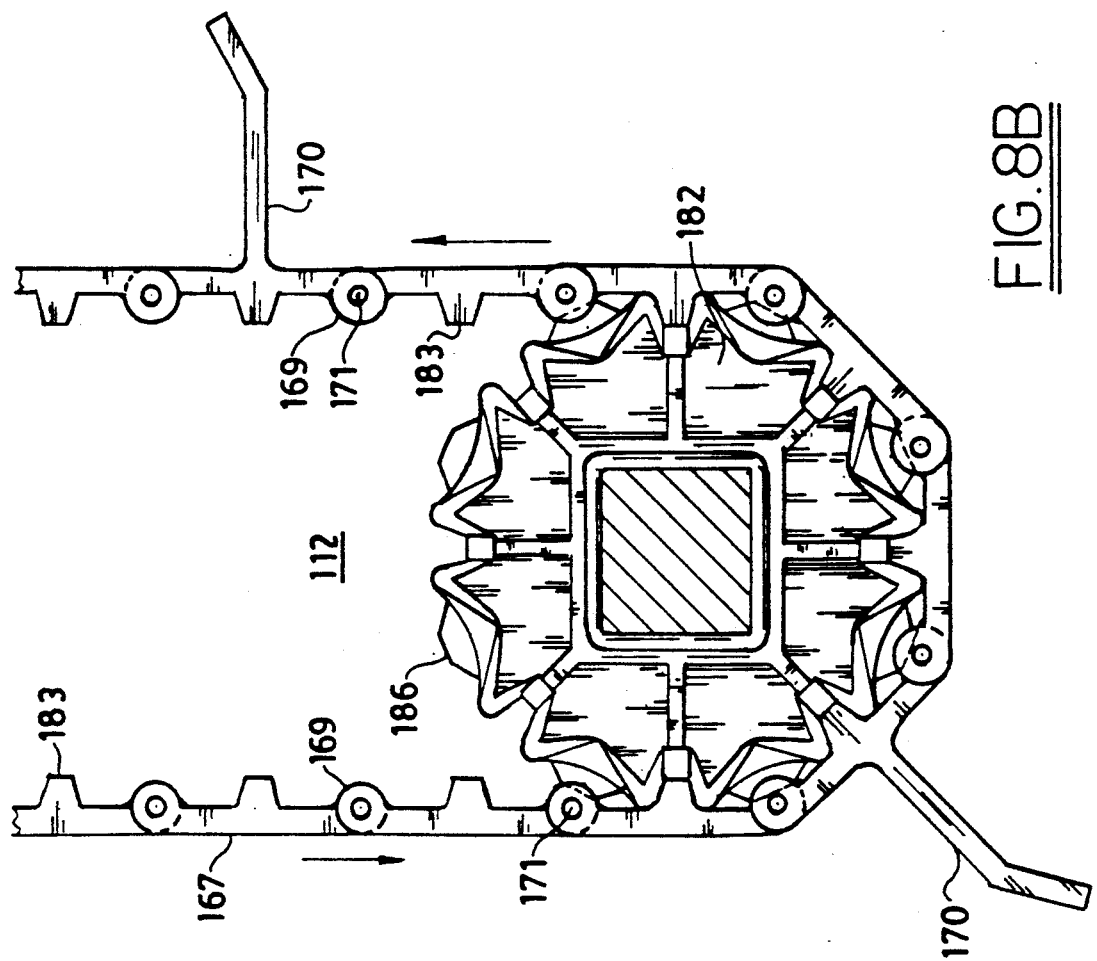
FIG. 8 is a elevational view showing the vertical, "J" shape elevator in greater detail.
Figure 8A:
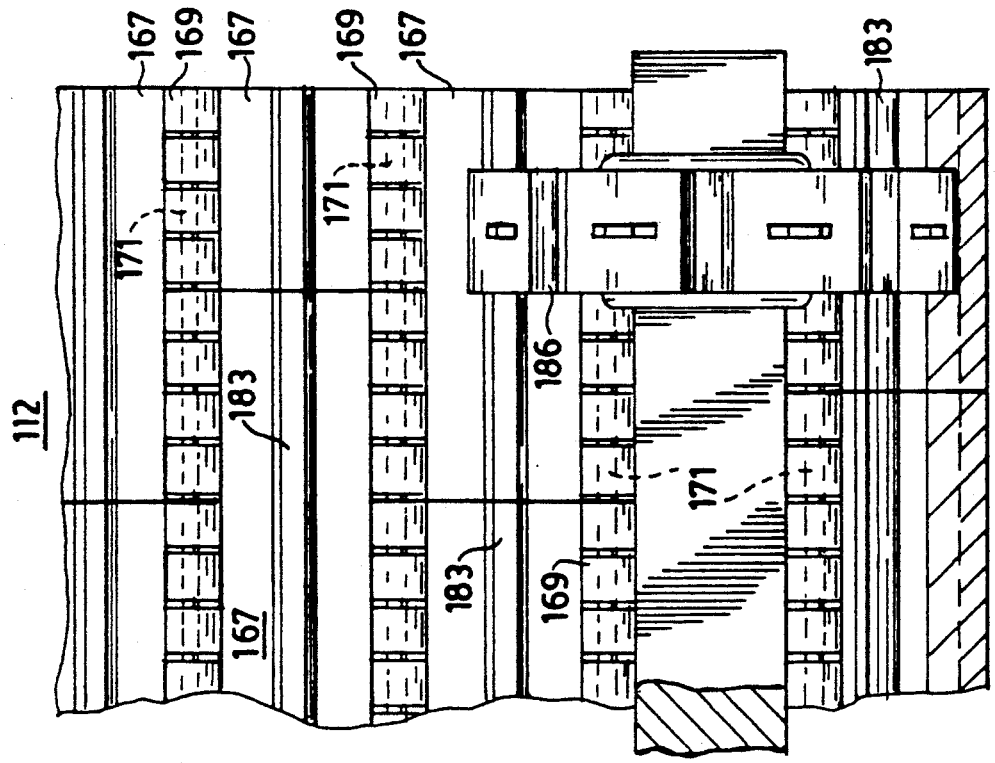
Figure 10:
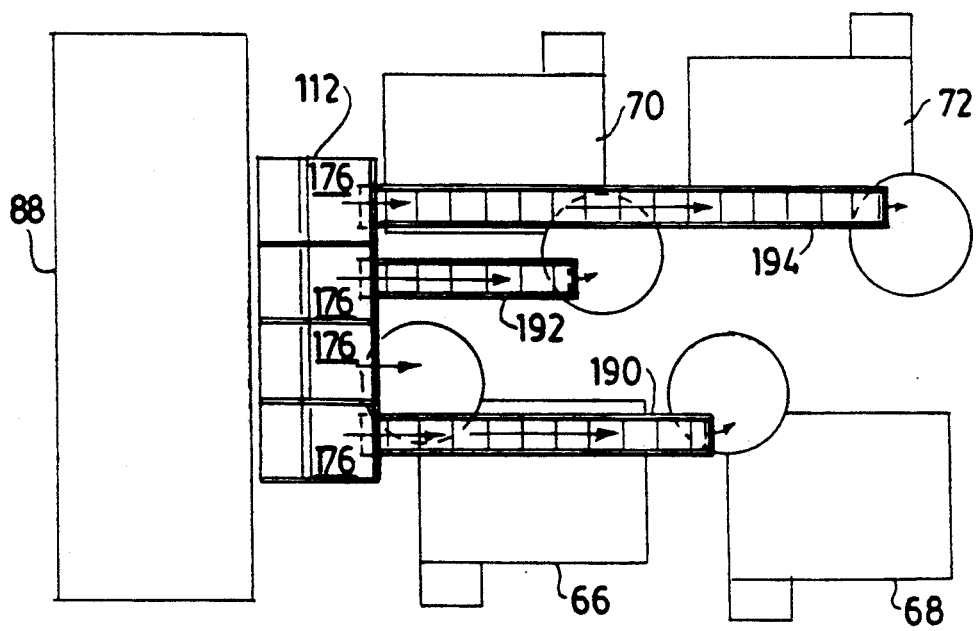
Figure 11:
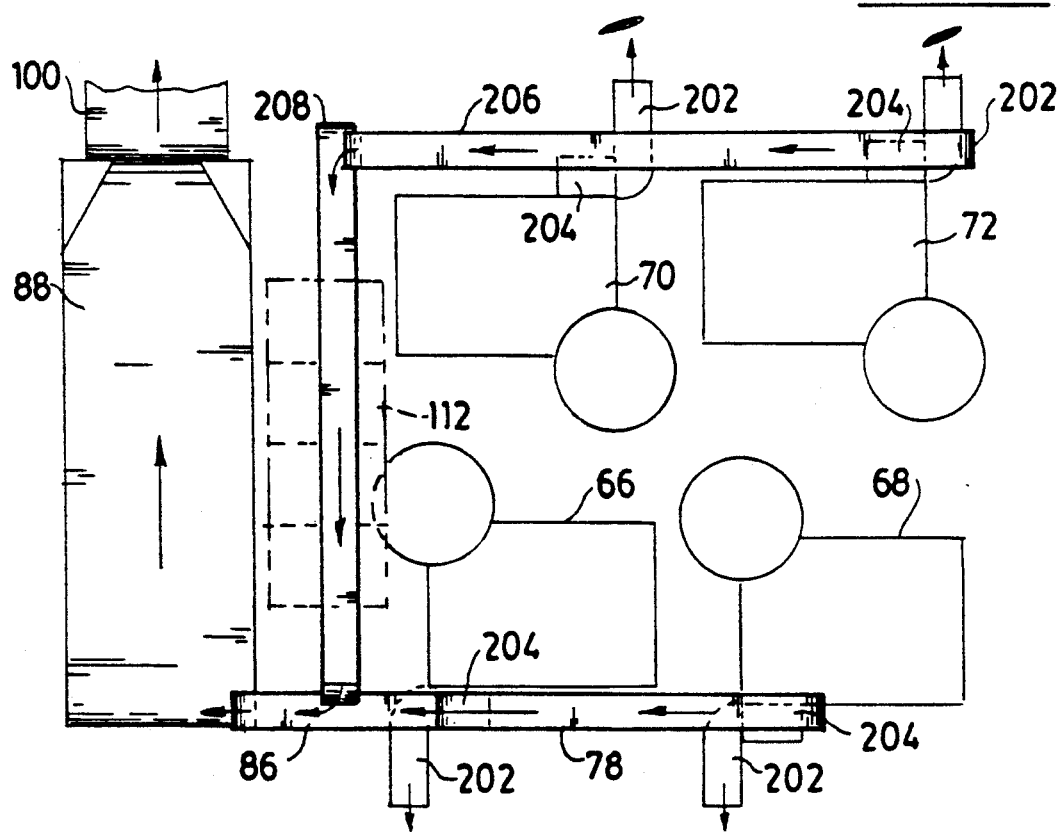
Figure 12:
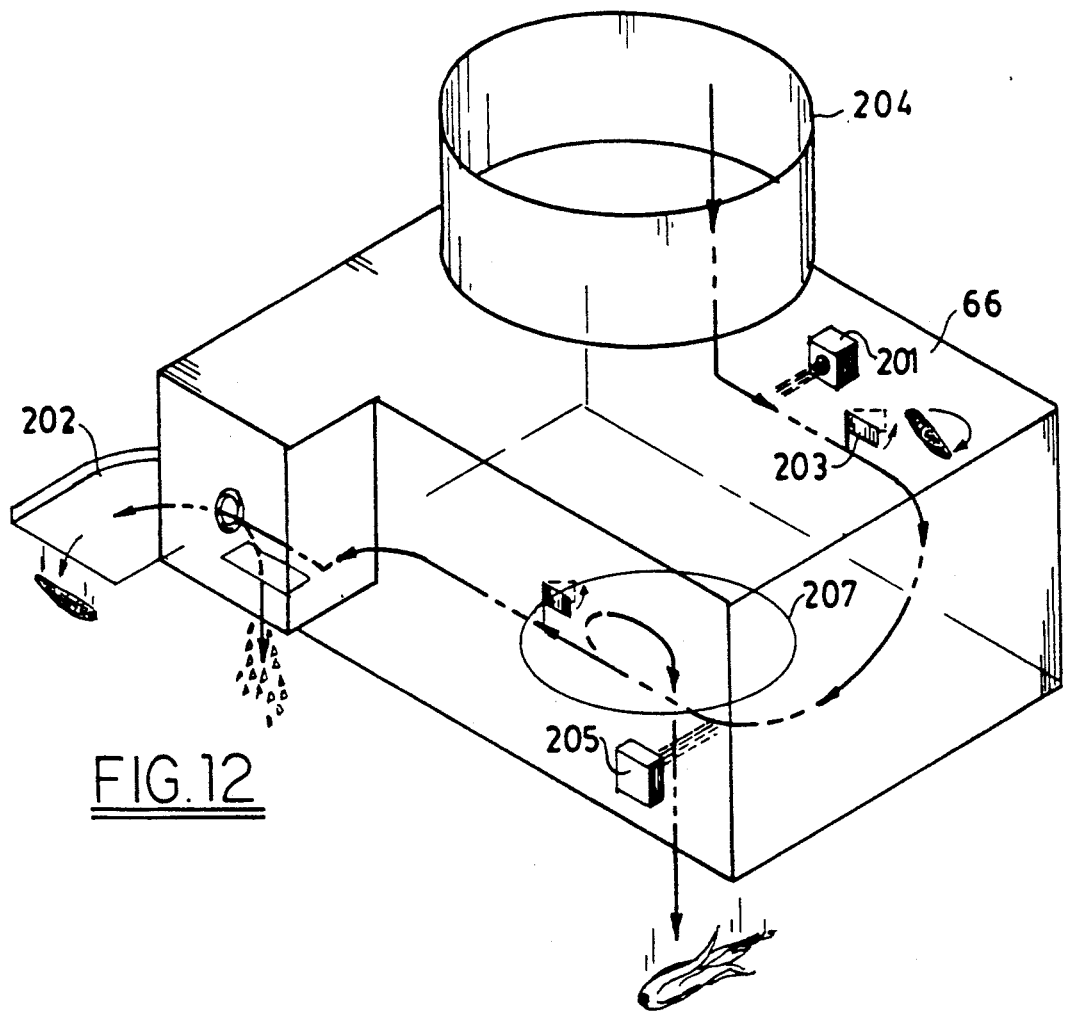
Figure 13:
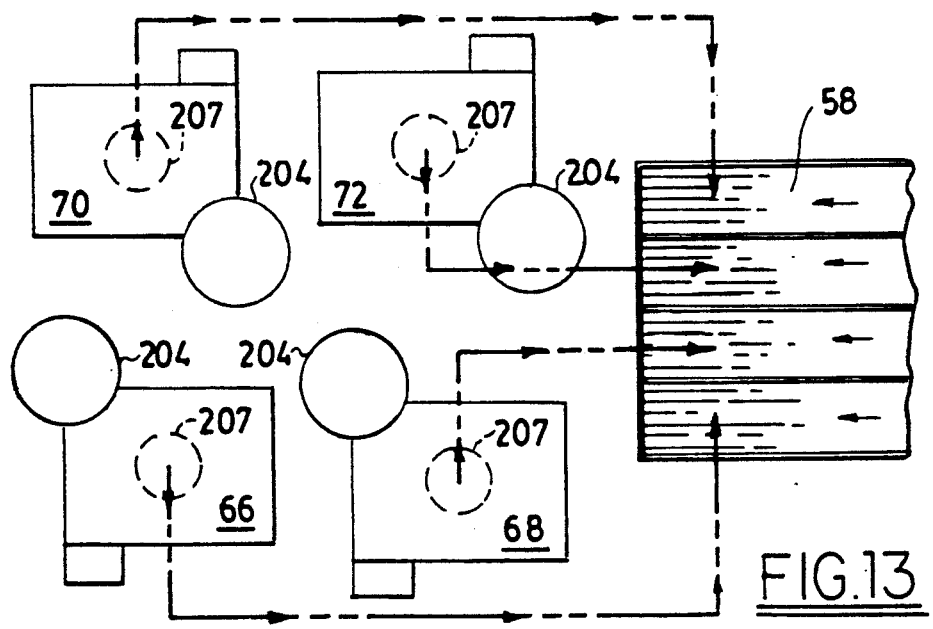
Figure 14:
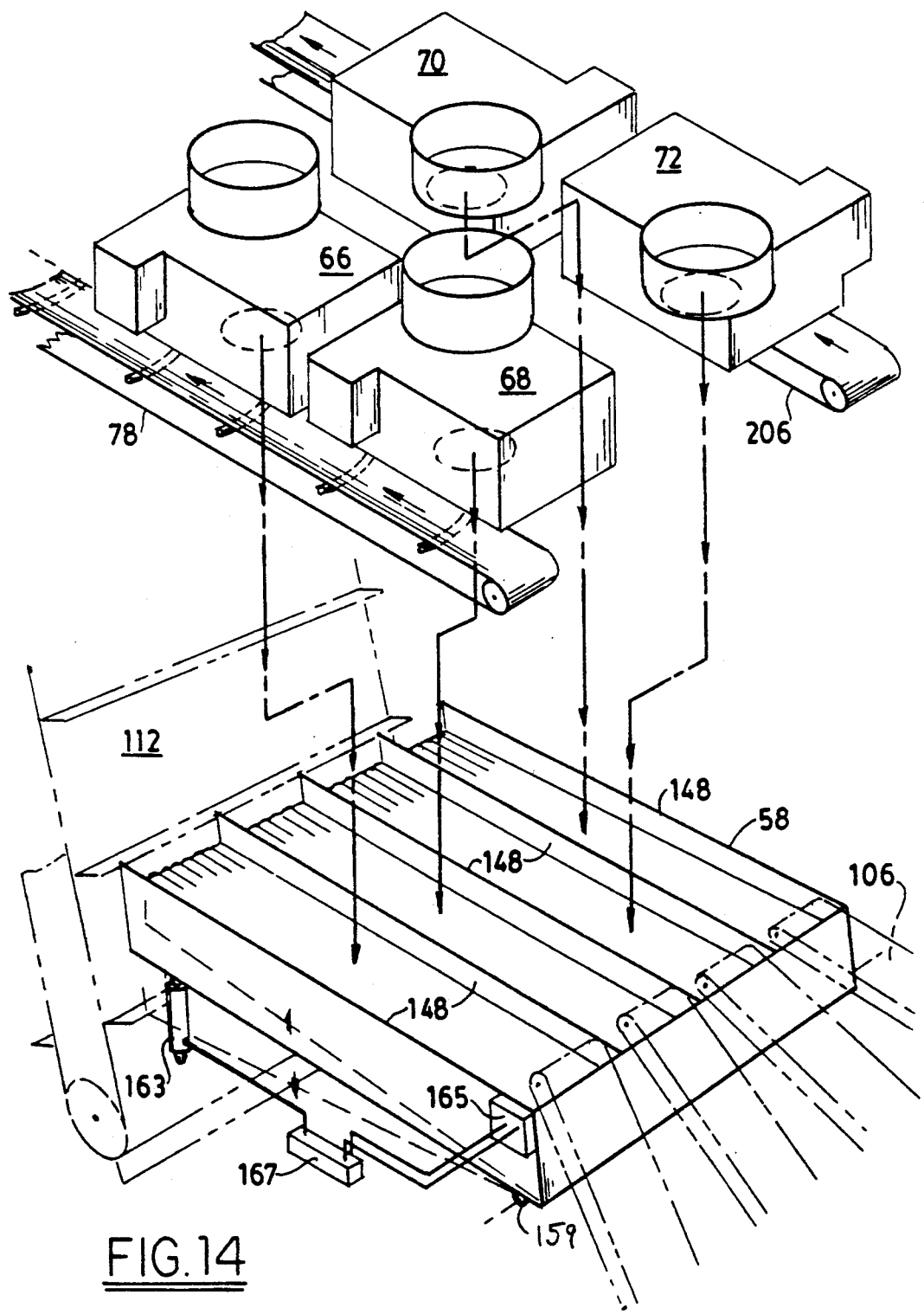
Figure 15:
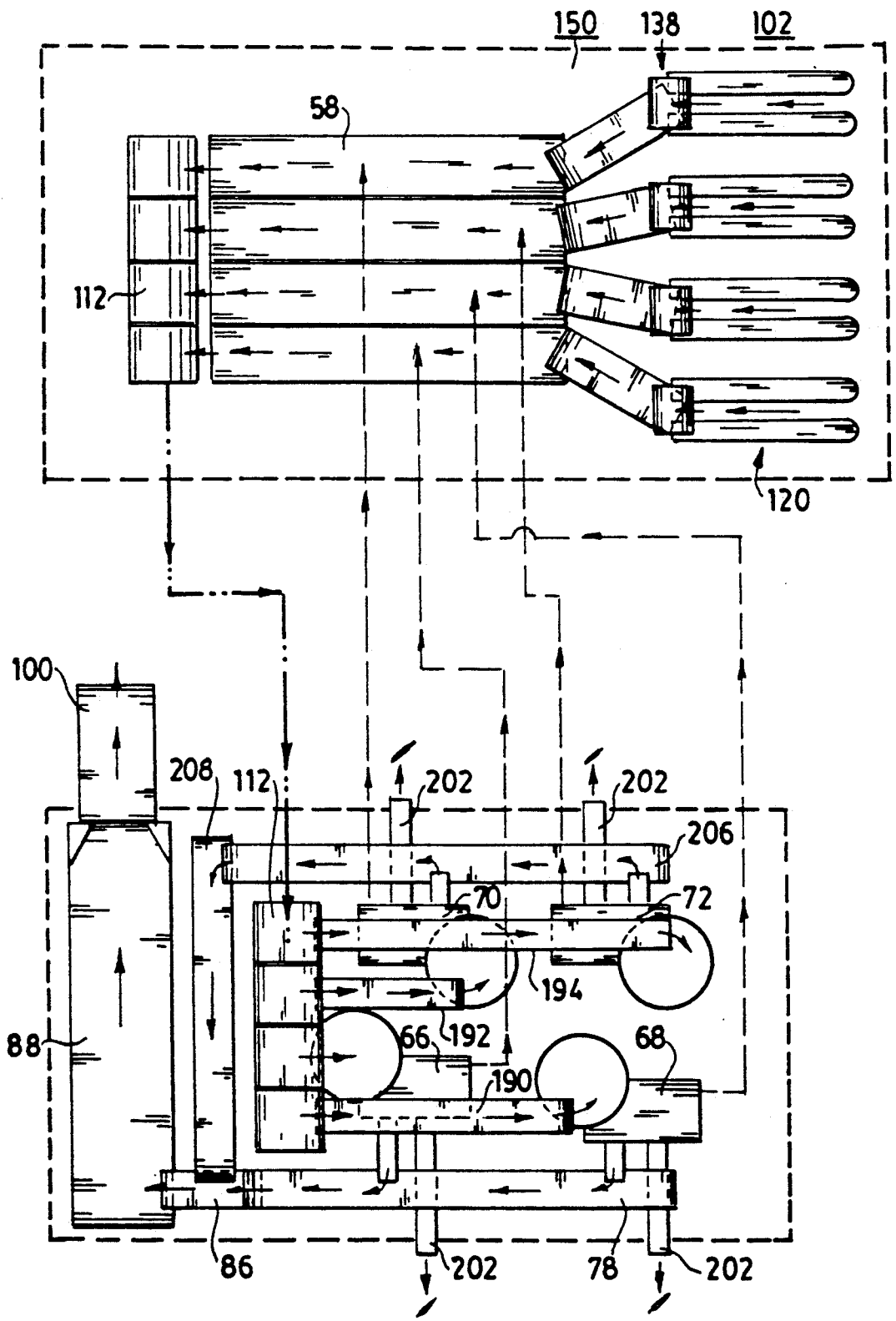
Figure 16:
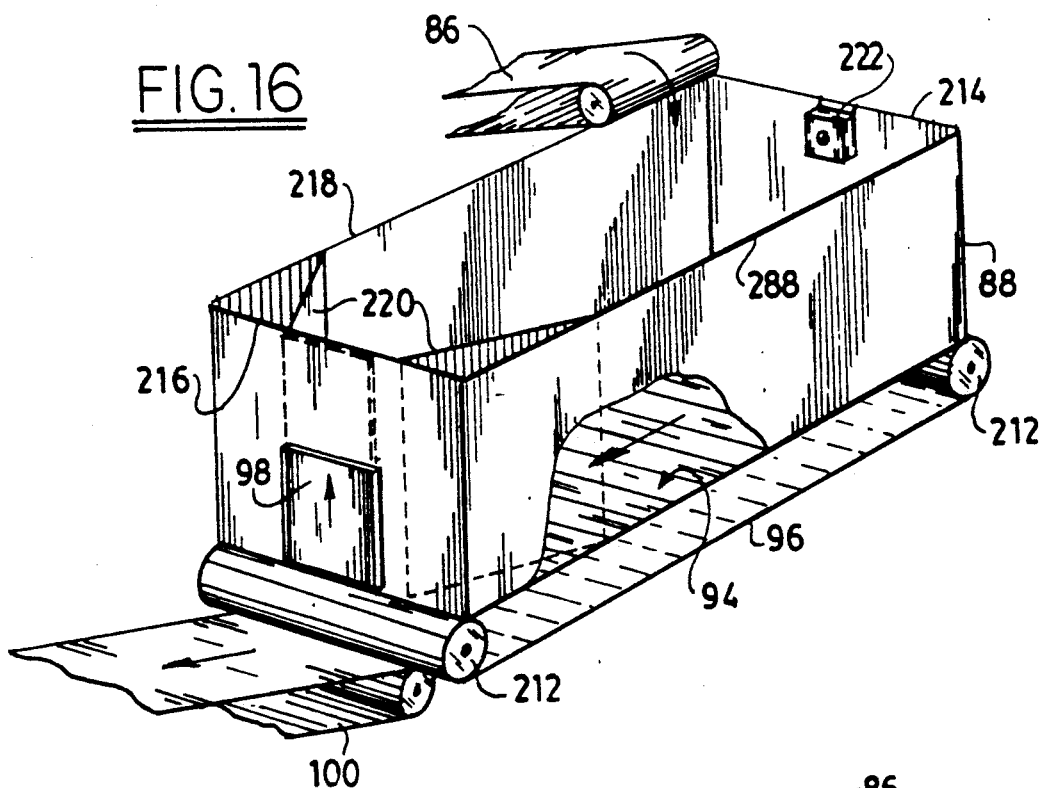
Figure 17:
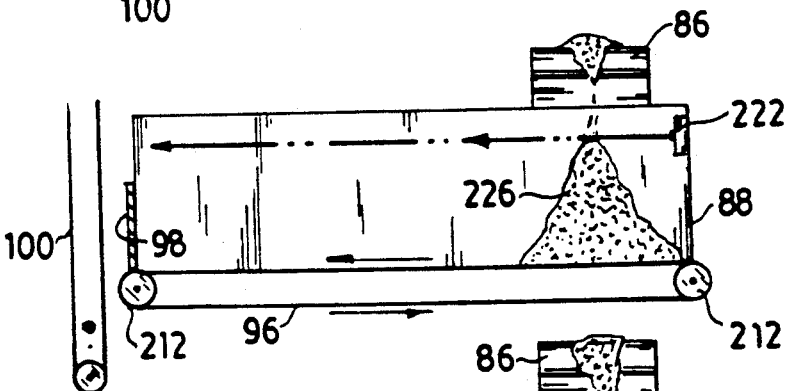
Figure 18:
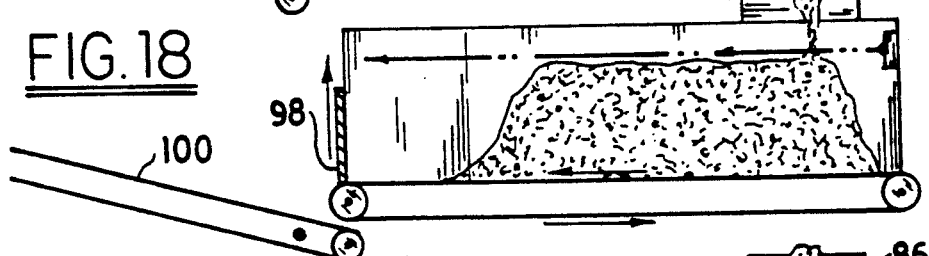
Figure 19:
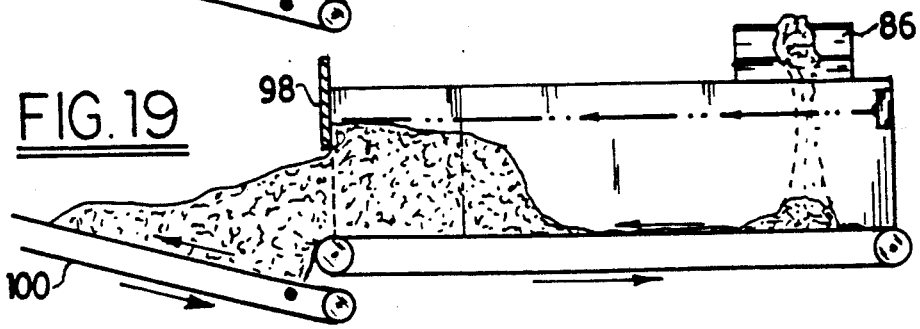
Figure 20:
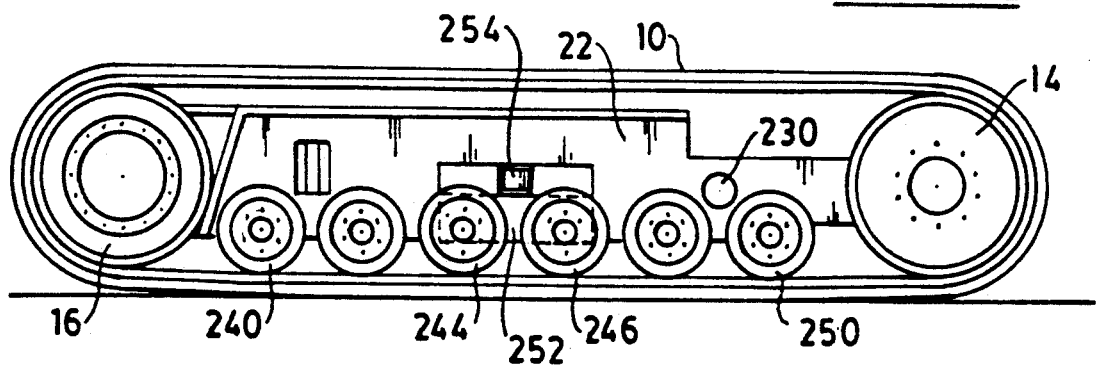
Figure 21:
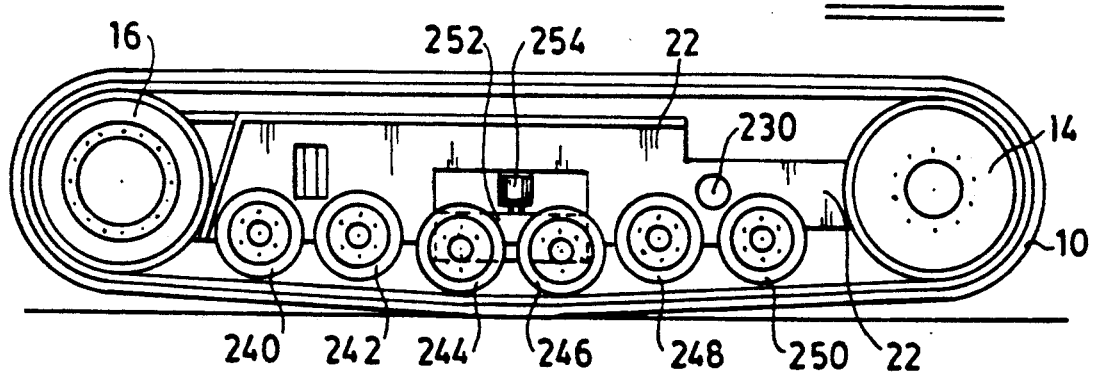
Figure 22:
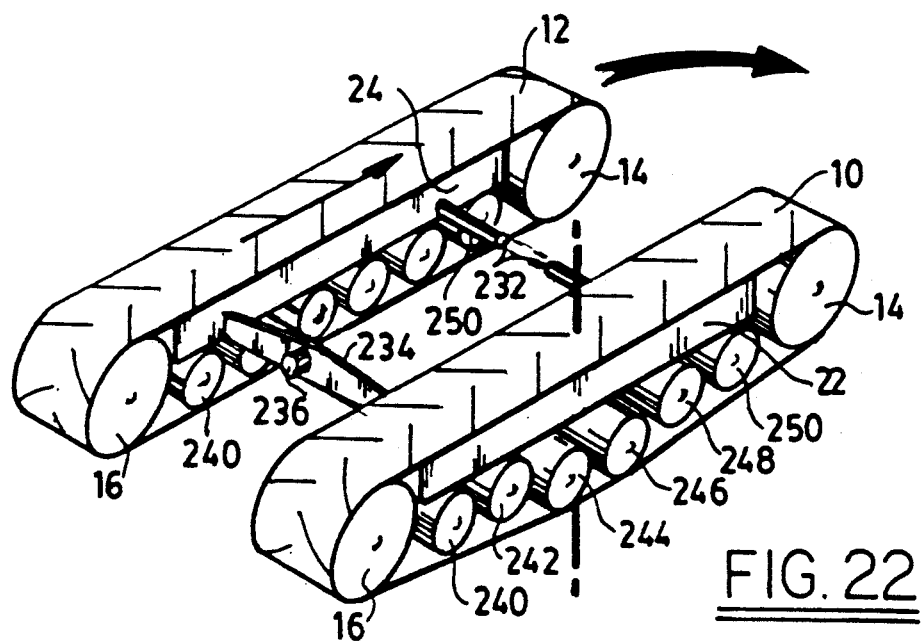
Figure 23:
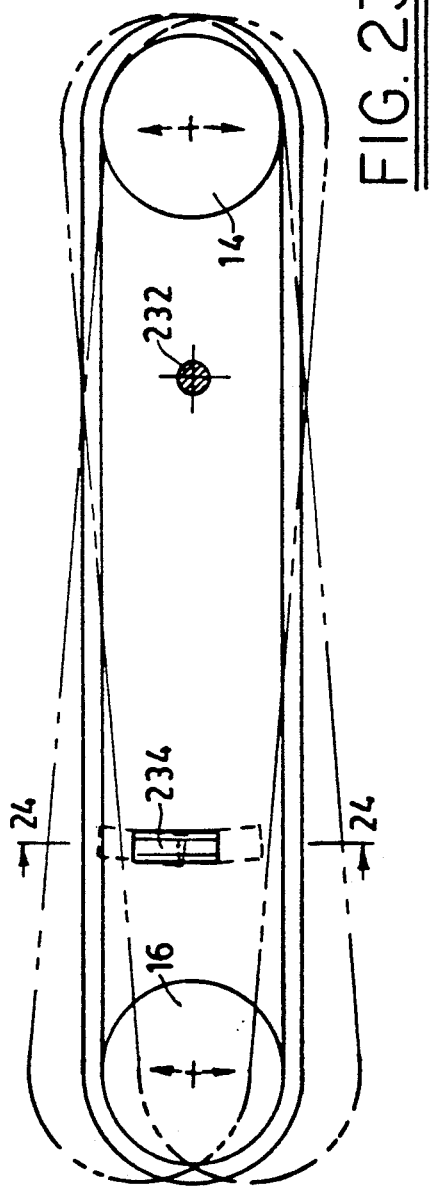
Figure 24:
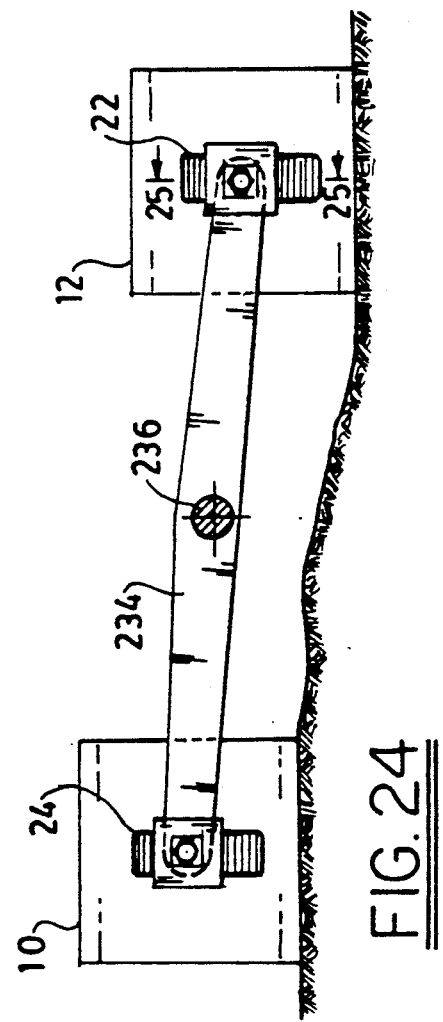

FIGS. 8A & B are fragmentary, detailed elevational front and side views showing the drive mechanism provided by the teeth on the inside of the elevator and sprockets engaging these teeth;

FIG. 9 is a perspective view of the elevator shown in FIGS. 8, 8A and 8B and also showing the flexible knocker bars for orienting the husked ears of corn on the flights of the elevator conveyor;

FIG. 10 is a schematic diagram illustrating the flow of ears between the elevator conveyor and the cutting machines;

FIG. 11 is a schematic diagram illustrating the flow of kernels and cobs from the cutting machines;

FIG. 12 is a perspective, diagrammatic view schematically showing the operation of one of the cutting machines;

FIG. 13 is a diagrammatic plan view showing recycling of ears from the cutting machines;

FIG. 14 is an exploded perspective view showing the husking bed, the system for controlling the inclination thereof, the four cutting machines, the kernel discharge conveyors and the recycling arrangement;

FIG. 15 is a schematic view illustrating singulation with respect to each row and each corn head of the corn picking, husking and kernel cutting, and the conveying operations;

FIG. 16 is a perspective diagrammatic view of the kernel container assembly;

FIG. 17, 18 and 19 are schematic views of the corn containing and depositing assembly in various positions during typical operation thereof;

FIG. 20 is an elevational view showing the undercarriage in normal traveling position;

FIG. 21 is a view similar to FIG. 20 showing the extension of ground rollers to define a pivot to facilitate turning of the harvesting machine;

FIG. 22 is a perspective illustrating the undercarriage in greater detail;

FIG. 23 is a diagrammatic elevational view of one of the walking beams of the undercarriage showing the action thereof;

FIG. 24 is a rear end view of the undercarriage showing the cross beam; and

Figure 25:
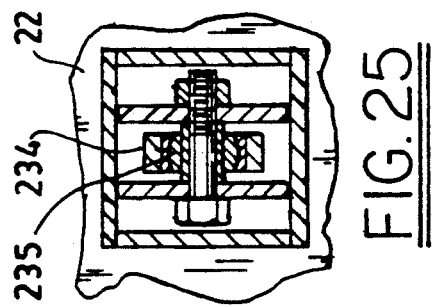

FIG. 25 is a fragmentary sectional view showing one of the joints connecting the cross beam to the walking beam, the section being taken along the line 25—25 in FIG. 24.

Referring to FIGS. 1-4, there is shown a corn kernel harvesting machine which incorporates the system of the invention in accordance with the presently-preferred embodiment thereof. The machine is a self-propelled tracked vehicle. Cleated tracks 10 and 12 of elastomeric material (similar to what is used in auto tires) are mounted on idler and drive wheels 14 and 16 and tensioned by an accumulator-backed (for constant pressure) hydraulic cylinder 18. The wheels are mounted on beams 22 and 24 (see also FIG. 22) of an undercarriage or chassis 26.

A diesel engine 28 and its associated radiator 30 is mounted on the chassis 26 and drives hydraulic pumps 32, which are connected by lines 34 to provide motive power for actuating and operating various hydraulic motors of the system. The pressurized hydraulic fluid provided by these pumps actuates hydraulic cylinders, such as the cylinder 18, and motors in the drive wheels 16 and drive motors associated with the conveyors and other movable components of the system.

Figure 7:
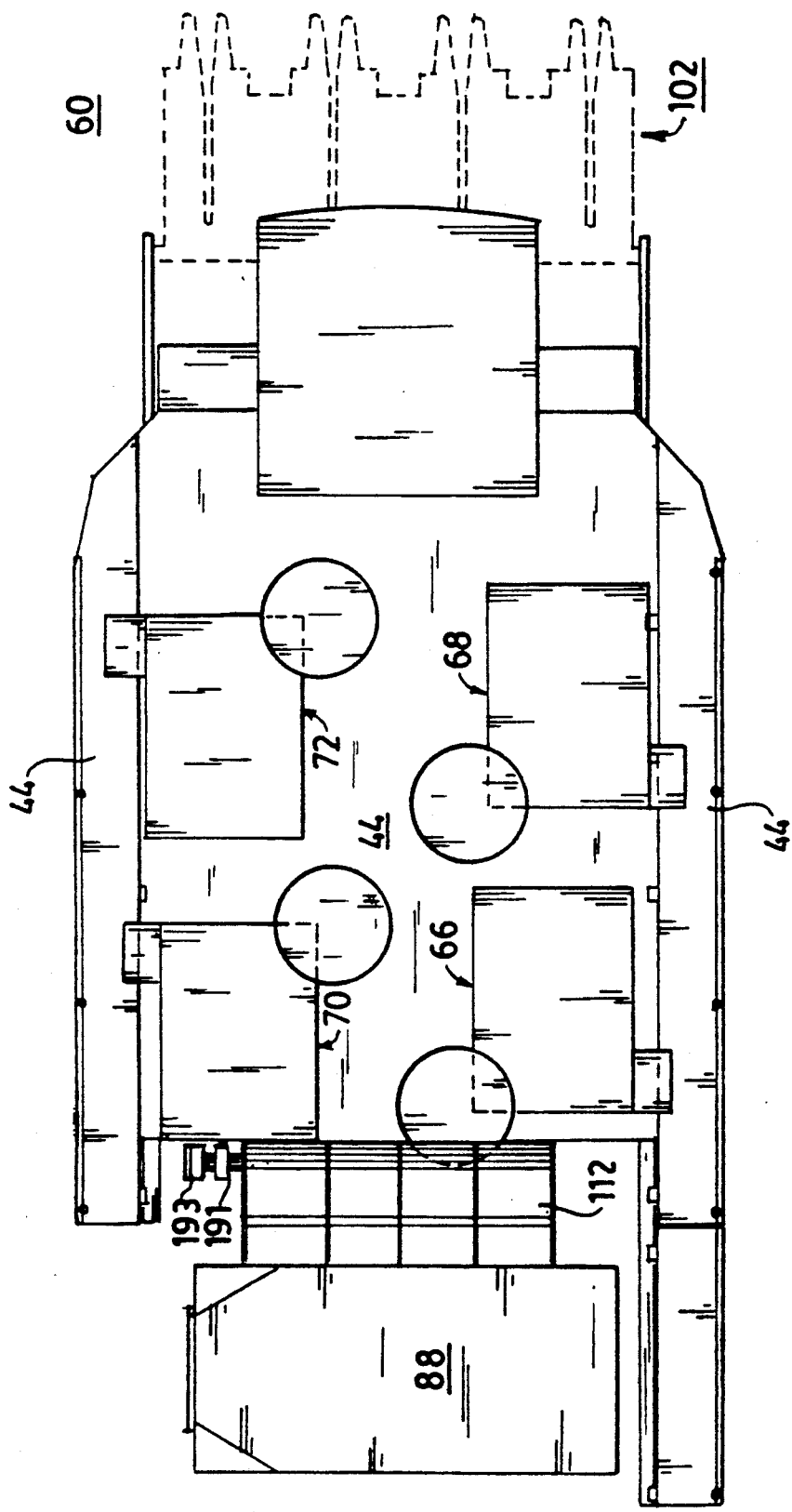
FIG. 7 is a plan view of the upper story showing the arrangement of the kernel cutting machines, the view being taken generally along the line 7—7 in FIG. 5.

A superstructure 38 is supported on the undercarriage 26 and is made up of a generally rectilinear framework of steel tubing. The tubing is generally rectangular in cross section. A first story 40 and the second story 42 of the superstructure is defined by this framework. Catwalks 44 (see FIG. 7) on the upper story 42 provide access for an operator who oversees the kernel harvesting operations. The ladders 46 and 48 provide access to the catwalk and to a cab 50 in which the driver of the harvesting machine is located. The facilities 51 for controlling the speed of the machine over the ground and steering the machine are controlled in the cab 50.

Railings 52 around the catwalk are for safety purposes. Posts 54 extending from the railing supports a cover or awning 56 of fabric material. This awning shades the kernel cutting operations on the second story 42 and decreases exposure to the rays of the sun, both of the kernels and of personnel for their comfort and protection. This awning is removed when the vehicle is transported over the highway and roads between the fields. Because of the relationships of the components and the structural configuration of the machine, it is capable of being carried, for example, on a standard flat-bed trailer with 20 inch road clearance. Then overall height of the machine and trailer is sufficiently low to satisfy the height clearance requirements for highway travel. Thus, special overheight permits or routing for travel over highways and roads are not required.

The lower story 40 contains a husking bed 58 of parallel husking rolls (suitably 24 rolls which turn on axes extending longitudinally between the forward end 60 and the rear ends 62 of the harvesting machine. Also carried on the framework, which provides the lower story 40, is a tank 64 which may be of the order of 200 gallons capacity which carries water which is pumped from the tank 64 and carried via hosing so as to be sprinkled on the husking bed and on the four kernel cutting machines 66, 68, 70 and 72 (see also FIG. 7) which are mounted on the upper story 42. A framework 74 supports the legs 76 (see also FIG. 5) of the kernel cutting machine 66, 68, 70 and 72.

The water from the tank 64 may also be used to hose down and clean the container and various parts of the harvesting machine. This is desirably done every few hours to prevent starch accumulation which is undesirable and may interfere with moving parts of the components of the machine.

The kernels which are cut by these machines are carried by conveyors 78, 86, 206 and 208 which are cup-shaped in cross section to retain the kernels (see also FIG. 11 and 14) to a cut kernel container 88 mounted on the upper story 42 at the rear end 62 of the machine. This container 88 and its operation will be described in greater detail hereinafter in connection with FIGS. 16-19. A post 92 in back of the container has a hydraulic motor driven winch 93, a cable 95 from which is connected to a pivotable discharge conveyor assembly 100.

Figure 4:
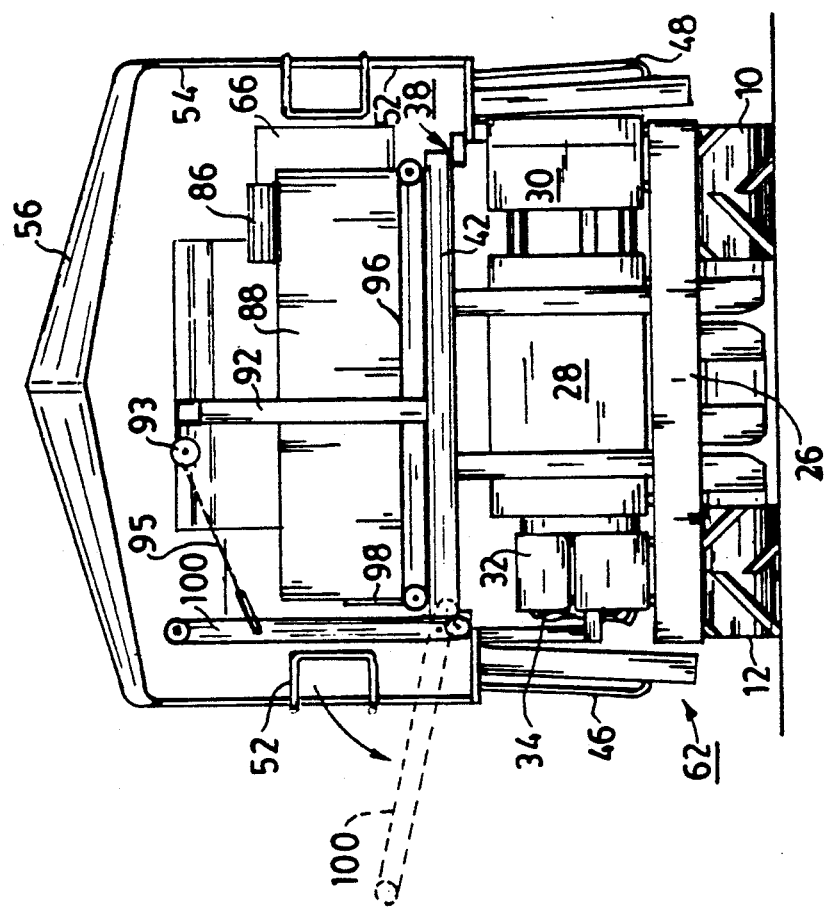
FIGS. 3 and 4 are front and rear end elevational views of the machine shown in FIGS. 1 and 2.

As shown in FIG. 4 and 16, the container has a moving floor 94 provided by an endless belt 96 which is moved incrementally from right to left as viewed in FIG. 4 to enable successive piles of kernels to be formed thereon and thereby uniformally distributed in the container 88. These piles are advanced to a door 98 at the discharge end of the container 88 and fall on the discharge conveyor 100 shown in full lines in stowed position in FIG. 4, and in dashed lines in extended position, where it extends over a truck having a bed which receives the kernels. Such pick-up trucks move alongside the harvesting machine at its speed so that the kernels can be discharged and carried by the truck to the processing plant without stopping the harvesting machine. Corn kernel harvesting operations thus may go on continuously thereby making full utilization of the harvesting system.

A corn head assembly 102 removes the ears from the stalks growing in a plurality (four in this embodiment) of adjacent rows of corn plants. The illustrated corn head has four auger-type ear delivery mechanisms and may have gathering belts and stripping rolls, for example as shown in U.S. Pat. 4,845,930 issued to Paul Dow on Jul. 11, 1989. Rearwardly of the auger section (120, see also FIGS. 5, 6 and 15) of the corn head 102 are four separating conveyors 104 and four relatively-inclined loading conveyors 106 which elevate and load the corn ears onto the forward end of the husking bed 58. These loading conveyors 106 are inclined since they direct the corn from the corn head which may be 90 inches (30 inches between centers of the stalks) to approximately 72 inches which is the width of the husking bed); it being desirable to use a commercially-available husking beds which are produced in 72-inch widths.

Figure 1:
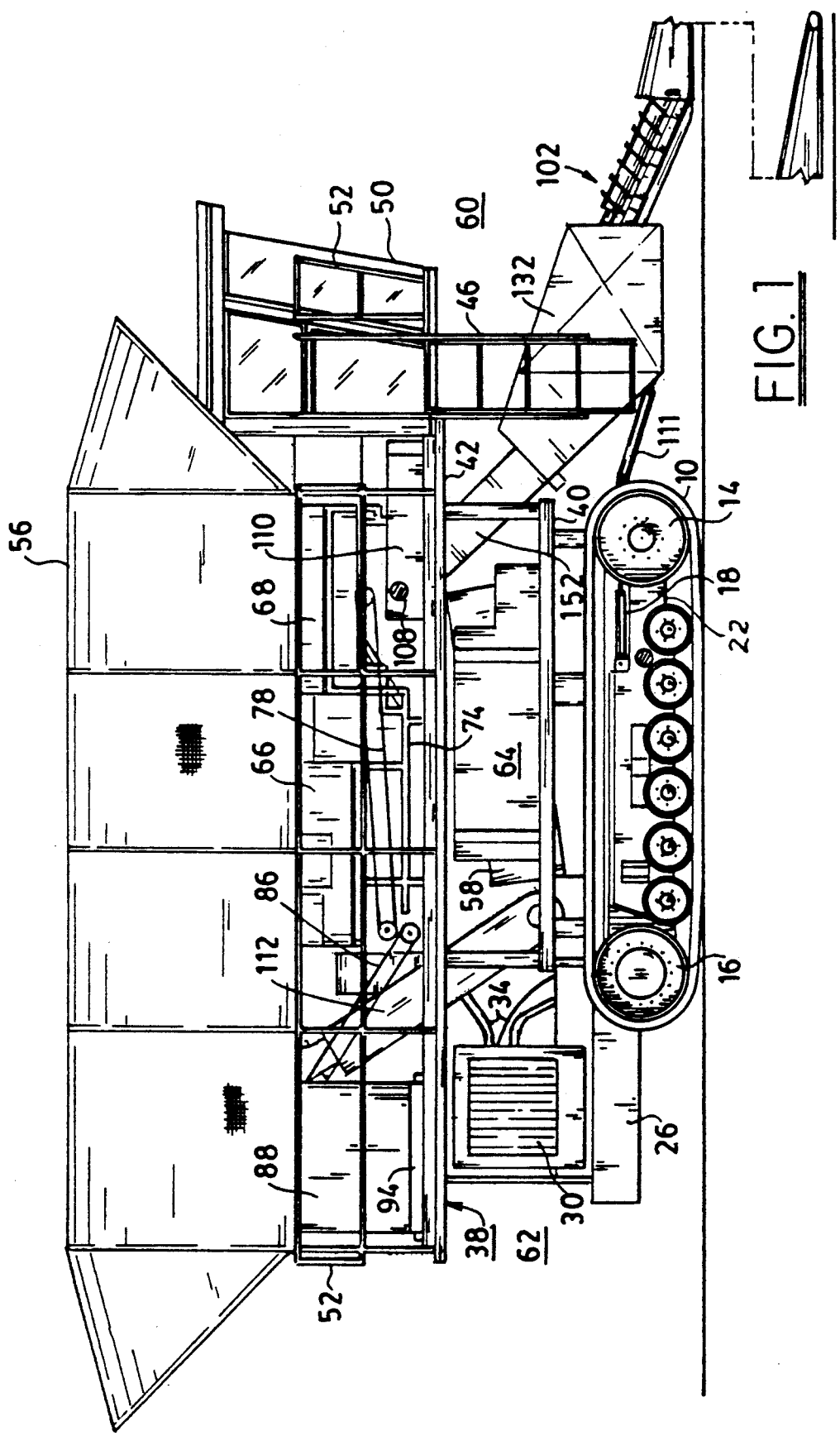
FIG. 1 is a side elevational view of a harvesting machine embodying the invention.
Figure 2:
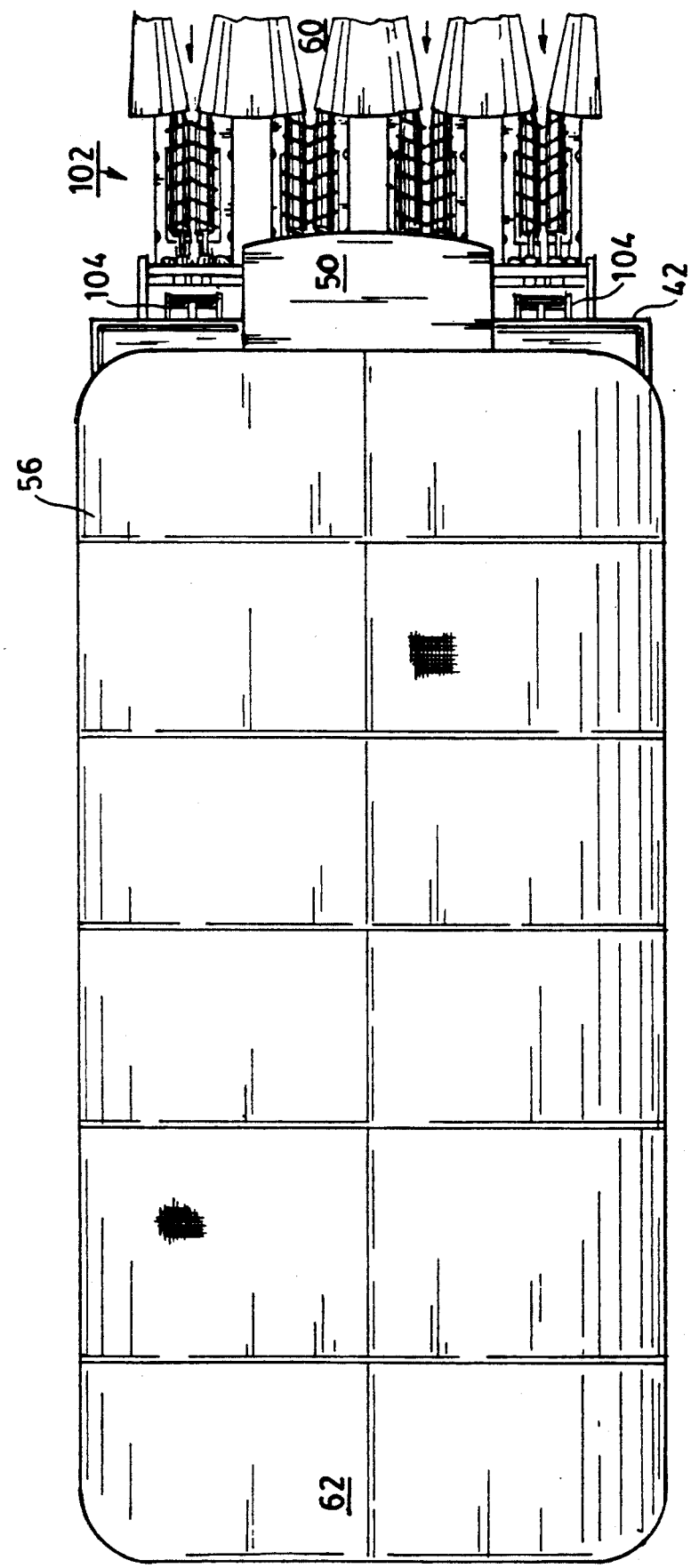
FIG. 2 is a plan view of the machine shown in FIG. 1.
Figure 3:
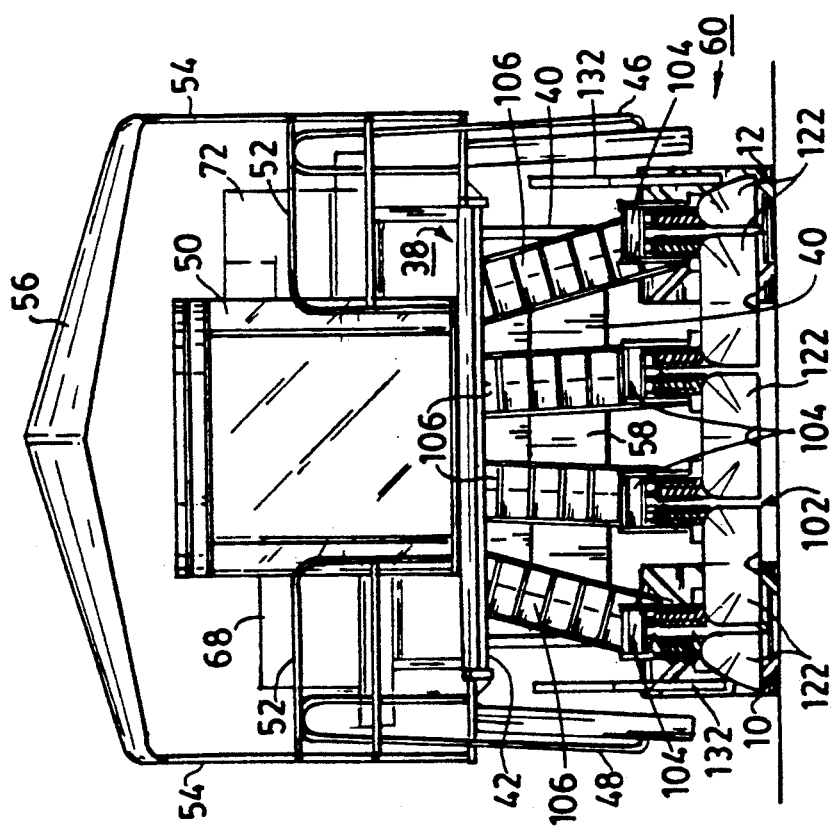

The separating conveyors 104 and their operation are discussed in greater detail hereinafter. They have bins defined between flights into which bins the ears drop. Any remnant stalks, which are not directed back onto the ground in the auger section 120 of the corn head 102, lie on the top of these bins where they are engaged by sets of ejection rolls 109 (one set at the confluence of each separating and loading conveyor 104 and 106, as shown in FIG. 5) which rolls 109 eject the remnant stalks onto the ground. The corn head assembly is pivotally mounted on the upper story 42 on a shaft 108 in a support structure 110. A hydraulic cylinder 111 extending from the undercarriage 26 raises the corn head assembly 102 when the harvesting machine is to be transported and lowers it to operating position as shown in FIGS. 1, 3 and 4.

It will be observed as the description proceeds, particularly from FIG. 15, that the system has a singular relationship (singulation) between each row of stalks and each kernel cutting machine 66-72. Singulation as provided for in the system of this invention ensures that ears from each row are carried in separate conveyors through separate lanes of the husking bed and thence along separate lanes in a vertical elevating conveyor 112 (see also FIG. 10) to each of the kernel cutting machines 66-68, individually. Advantage is taken of the generally uniform density of planting which provides generally uniform yields from each row of corn plants. The system is therefore simplified by virtue of elimination of any mechanisms for distributing the ears to the kernel cutting machines so as to equalize the load (the amount of ears) which are presented to kernel cutting operations. The arrangement of the cutting machines on the upper story and the husking bed on the lower story also provide an additional feature of recycling any green ears, or ears from which kernels cannot be cut because of jamming in any individual machines, for example, by returning them to the husking bed (see also FIGS. 12, 13 and 15) thereby avoiding stopping the machine in the event of a jam in the cutting machines or if incomplete husking occurs. Still another feature is the arrangement of the cutting machines and the husking bed as well as the corn head so that stalks, husks and cobs are ejected and fall to the ground where they may be picked up for silage or plowed under for soil conditioning purposes.

The corn head assembly 102 is shown in greater detail in FIG. 5. The corn head includes a corn picking section 120 having generally conically-shaped covers 122 and augers 124. These covers 122 are removed in FIG. 6 for purposes of illustration of the section 120. These heads guide the stalks between pairs of these augers 124 which overlie ear stripper plates 126. Stripping and picking operations are discussed in the above-referenced Dow patent. The augers 124 can be driven by a common (via a chain drive) or individual hydraulic motors 128 which are mounted on a support beam 130 connected between side plates 132 (see also FIGS. 1 and 3). Struts 134 are disposed between the stripper plates 126 and maintain them and the covers 122 and the augers 124 in assembled relationship in the picking section 120 of the corn head.

The ears are swept by gathering belts 127 over each stripper plate 126 onto platforms 135 which extend between the beam 130 and another lateral beam 136 in a second section 138 of the corn head which contains the separating conveyors 104. The separating conveyors are endless chain conveyors having flights or Paddles 140 which define bins into which the ears of corn fall. The separating conveyors are driven by belts or chains 142 and are supported on shafts 144 which extend between the side plates 132.

As shown in FIG. 5 any remnant stalks which are not ejected to the ground in the course of the picking or stripping of the ears from the stalks lie on the tops of the bins and are presented to ejecting rolls 109. A pair of such rolls are located at the confluence of each separating and loading conveyor 104 and 106. The ejection rolls have overlapping fins which engage the stalk and drive them forcibly in spaces between the conveyors 104 and 106 so that they are ejected onto the ground thereby avoiding jamming of the conveyors and interference with conveying and husking operations as might be caused by these stalks if they were carried up to the husking bed 58. The operation of stalk ejection rolls is also discussed in U.S. Pat. 4,999,983 issued Mar. 19, 1991 to Donald Britt and Steven Dow.

The ears on the separating conveyors 104 are deposited on the husking bed loading conveyors 106 where they are carried to the elevated end (the forward end) of the husking bed 58. The loading conveyors 106 are inclined inwardly and feed separate lanes defined by separator plates or vanes 148 of the husking bed. While four lanes are preferred, six (as in commercially available beds) may be used and then there is some sharing of ears from the loading conveyors 106. The husking bed may be of the type commercially available with counter-rotating pairs of rolls which pinch and engage the husks, removing them while rolling the ears as they move under the force of gravity to the lower end of the bed.

The loading elevators 106 are supported in the third section 150 of the corn head. This third section is principally defined between a second pair of side plates 152 which are interconnected by shafts 156 and are connected to a lateral shaft 158 between the outer side plates 132. These inward plates 152 (see also FIG. 1) are journaled on the shaft 108 which is mounted on the support structure 110 which is in turn mounted to the upper story 42. The cylinder 111 is one of a pair of cylinders which are connected to the beam 130 between the side plates 132. Pressurized hydraulic fluid is selectively applied to the cylinders to pivot the entire corn head assembly 102 upwardly when the cylinders 111 are extended so as to raise the head lifting it away from the ground, and downwardly to lower the head into operating position, as shown in the drawings, for the picking and removal of the ears from the stalks simultaneously in four adjacent rows of corn stalks.

As also shown in FIG. 14, the husking bed is pivotally mounted at its forward end on a journal 159 on a support 161 extending upwardly from the deck which defines the floor of the upper story 42. The bed 58 is connected by hydraulic cylinders 163 at its rear end to the undercarriage thereby supporting the husking bed on and within the lower story of the structure. Mounted on the side of the husking bed is a level switch 165 which detects a shift in inclination from a predetermined inclination due to the machine travelling over a hill or into a valley. When a change in inclination, for example of approximately $\frac{1}{2}°$, is sensed, a control signal is applied to an electrically controlled hydraulic valve 167 to extend or retract the cylinders 163 thereby maintaining the husking bed at its desire orientation. For general husking operations at typical speeds of travel of the machine over the ground, an angle of inclination with respect to the horizontal (the forward end of the bed above the rear end thereof) of approximately 6° has been found suitable. For more difficult or tightly bound husks, it may be desirable to flatten this inclination, reducing it, for example, to 5°. For it to be easier to husk ears and when faster husking operations are desired, the angle of the husking bed may be made steeper. The switch 165 which detects variations in inclination may be adjusted in inclination to correspond to the inclination of the bed. A pendulum switch and control, such as manufactured by Sauer-Sundstrand of Minneapolis, Minnesota, USA their Model No. ACW112D1129, has been found suitable to provide signals for maintaining the predetermined inclination of the husking bed.

The husked ears of corn are discharged by gravity from the husking bed at the lower rear end thereof onto the vertical elevator conveyor 112. This conveyor is shown in FIG. 5, 6, 8, 8A, 8B and 9. The elevator is "J"-shaped, the "J" being inverted. It is made up of a mosaic of sections 167 having ears 169 which are pivotally interlocked by shafts 171 to form an endless belt. The sections 167 of the mosaic have horizontal flights or paddles 170 which travel upwardly along the leg of the "J", then around the convex portion of the "J" and along a return reach having an upper arm 172 and a leg 174 which defines a generally "L" shape. There are stationary, longitudinal bars or vanes 178 which divide the conveyor into four parallel lanes 180 which are aligned separately with the lanes defined by the vanes 148 on the husking bed 58. The paddles 170 are preferrably straight, instead of cupped as shown in the drawing. When six lines are used, adjacent ones thereof are shared by the four lanes 180 of the elevator 112.

The shape of the conveyor 112 of the interlocked segments is determined by three sprockets 182, 184 and 186. Teeth 183 between the ears 169 engage indentations between the teeth of the sprockets 186. The design of the conveyor and its interlinked segments and the sprocket drive is shown in detail in FIGS. 8A and B. One of the sprockets 184 is driven by a chain drive 191 which in turn is driven by a hydraulic motor 193 (see FIG. 7). The sprocket shaft 182 applies tension to the conveyor belt using pneumatic cylinders (not shown). This chain drive also drives sprockets which motivate three endless conveyors 190, 192 and 194 (see FIG. 10) which deliver the ears of corn from the elevator conveyor to three of the cutting machines 64, 70 and 72. The ears are discharged at the discharge end, at the toe of the convex arm section 188 of the vertical elevator conveyor 112. Each of the lanes 176 delivers husked ears of corn to the hoppers of different ones of the kernel cutting machines 66, 68, 70 and 72. Only three delivery conveyors 190, 192 and 194 are used, in that one of the lanes 176 discharges directly into the receiving hopper of the cutting machine 66 which is closest to the discharge end of the vertical elevating conveyor.

Around the convex section near the discharge end and guarding it (spaced approximately the height of the flights 170 from the conveyor) is a guard plate 196 which forms the floor of the convex section and holds the ears of corn against dropping off the conveyor until they reach the discharge end 198 thereof.

It is important that the ears enter the hoppers of the cutting machines 66 and 68 oriented generally horizontally. To assure that the ears do not stand up against the flights, flexural (e.g., plastic, such as ultra high molecular weight (UHMW) polyethylene) knocker bars 200 connected at one end thereof to different vanes of the elevator conveyor extend across the lanes. These bars 20 engage any upstanding ears and direct them to lie down horizontally against the flights 170 of the elevator conveyor. The vanes are held stationary by a cross member (schematically shown at 199, but which may be located elsewhere along the conveyor 112) connected to the framework of the machine at the top of the elevator 112 and to the stationary shaft on which the lower sprockets are journalled at the bottom of elevator 112.

The kernel cutting machines 66, 68, 70 and 72 are identical except for the height of their legs which are inserted into tubular posts and fastened thereto by set screws to prevent them from sliding out of the posts. The machines have, as shown in FIG. 10 to 14 exit ducts 202 through which the cobs from which the kernels have been cut are ejected onto the ground. The machines also have hoppers 204 (see especially FIG. 12) into which the ears are deposited either directly from the elevator conveyor's discharge end or via the delivery conveyors 190, 192 and 194. The ears are viewed by a first opto-electrical sensor 201 which detects their orientation and operates, a gate 203 which orients the ears, narrow end first. The ears then pass a second sensor 205, a color-responsive sensor which detects green (unhusked) ears or ears which accumulate in the machine and might cause jams. These ears are recycled by being discharged to the husking bed. The discharge is via chutes schematically shown in FIG. 15 from openings 207 in the cutting machine's floors. The green or uncut ears from each cutting machine are discharged to a different lane of the husking bed than the lanes which fed that cutting machine. For example, the upper lane feeds the cutting machine 72. The machine 70 discharges the ears to the upper (as viewed in FIGS. 10, 11, 14 and 15) lane of the husking bed. Thus, if a machine is jammed, the uncut ears are likely to be recirculated to another machine which is not jammed thereby allowing harvesting operations to continue and avoiding the need to stop the harvesting machine in order to clear a jam.

As shown in FIG. 11 and 14, the kernels leave from discharge ducts 204 and drop upon discharge conveyors 78, 86 (see also FIG. 1). The cutting machine 70 and 72 along one side of the upper story have their discharge ducts above the conveyor 206. The conveyor 206 carries the kernels from these machines 70 and 72 to a cross-conveyor 208 which deposits them on the elevating discharge conveyor 86. The conveyor 86 receives kernels from the cutting machines 66 and 68, the discharge ducts 204 of which deposit the cut kernels on the conveyor 78.

As shown in FIG. 15 the singulation relationship, shown between the corn head 120, the lanes on the husking bed 58, the lanes on the vertical elevator conveyor 112, continues to the cutting machines. It is only after the kernels are cut that they are collected from the cutting machines on the discharge conveyors and deposited near one end of the collection container 88 where the elevating discharge conveyor 86 ends. No special devices are required to equalize the load on the cutting machines. The speed of harvesting is determined by the speed that the harvesting machine travels over the ground. Equality of loading is maintained because corn is planted in rows designed to provide a uniform yield per row. Uniformity is not exact, nor need it be, and if any machine is overloaded, the recycling feature of the system enables excess ears to be recycled to machines having lesser load as discussed in connection with FIG. 15.

As shown in FIGS. 16-19, the container 88 has a moving belt preferably provided by a mosaic of links having ears through which pins extend, interlocking them, and teeth for sprockets 212, one of which is a motor-driven drive sprocket while the other is an idler, which have indentations between teeth into which the ears are received in driving relationship. Since the same sprocket/belt drive is used as on the elevator conveyor 112, it is not shown in detail, but only schematically in FIGS. 16-19.

The container has opposite end walls 214 and 216 and side walls 218 having gussets 220 which define a funnel end tapering inwardly to the discharge door 98 of the container 88. The end wall 214 has mounted near the top thereof a sensor, suitably an ultrasonic sensor 222.

In operation, the kernels are discharged from the last discharge conveyor 86 near the end wall 214 until the pile of kernels 226 intercepts the beam from the sensor 222. Then the motor driving the floor conveyor 96 is actuated so as to enable the conveyor to be incrementally advanced (jogged) to present an adjacent floor area on which the pile builds. Ultimately, the container is uniformly filled to the level of the beam from the sensor 222. When the container is filled, as detected by the sensor beam continuously being interpreted, the door 98, which may be actuated by a pneumatic cylinder (not shown), is opened and the dumping conveyor 100 is swung to discharge position as shown in FIGS. 18 and 19. Then the floor is moved continually so that the kernels are allowed to fall through the opening in the doorway onto the belt 100 and thence into the bed of the truck (or containers carried on the truck) which accompanies the harvesting machine along the field.

Figure 6:
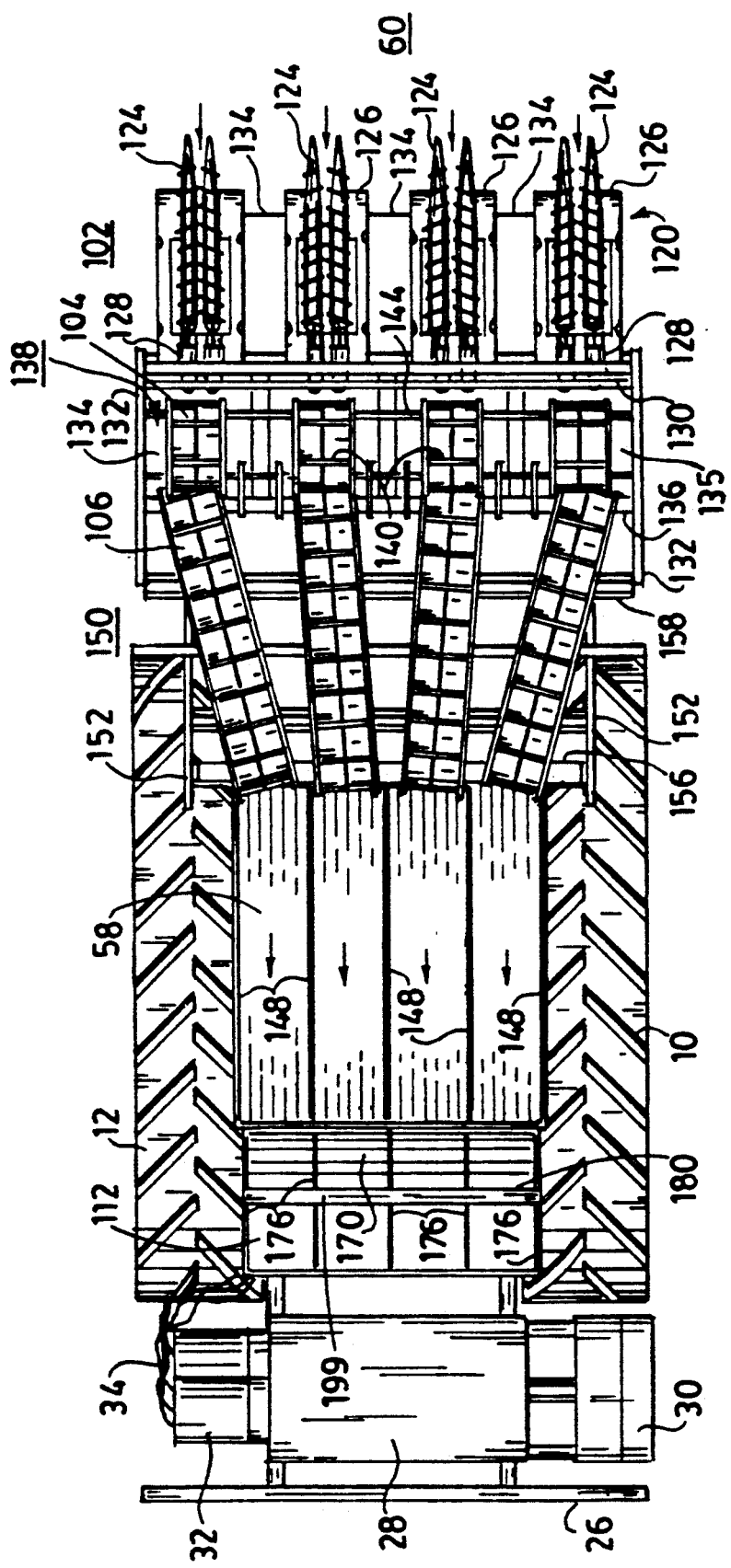
FIG. 6 is a plan view similar to FIG. 2 in section showing the lower story and the corn head assembly, the view being taken generally along the line 6—6 in FIG. 5.

The undercarriage has a box frame structure 26 (see FIGS. 5 and 6). This structure supports independent side (walking) beams 22 and 24. These beams 22 and 24 are pivotally mounted on stub axles 230 (shown as a continuous axle 232 and FIG. 22). These axles are near the front of the beams 22 and 24. The axles 230 are spaced from the idler wheels 14 as far back as possible considering the need for extension of the idler wheels 14 by the cylinders 18 (see FIG. 1) to tension the belt. The surface of the idler and drive wheels 14 and 16 is roughened or knurled to provide adhesion between the tracks 10 and 12 and the drive and idler wheels. It has been found that approximately 12,000 pounds of tension may be used and then prevents any slippage of the tracks 10 and 12 on the wheels 14 and 16.

Near the rear ends of the beams 22 and 24 is a cross beam 234 which is journaled on a stub axle 236. The ends of the cross beam 234 are pivotally connected to the side beams 22, 24 by ball joints 235 (see FIG. 25). The beams 22 and 24 then function as walking beams which suspend the undercarriage at three points in the journals 230 (at the end of the axle 232) and in the journal for the axle 236. The axles 232 have their axes horizontal while the axle 236 has its axis perpendicular to the axis of the axle 232. The movement of each beam is substantially independent as shown in FIGS. 23 and 24 so that the machine is able to follow the contours in the ground.

Six pairs of ground wheels 240 are journaled on axles connected to the beams 22 and 24 and support the lower reach of the belts 10 and 12 on the ground. The center pair of these wheels 244 and 246 are mounted on trucks 252 which can be raised or lowered by hydraulic cylinders 254.

It is desirable, when the machine is travelling over hard packed ground or paved surfaces, that the friction presented by the tracks during turning be relieved. This is done by extending the trucks and the two pairs of center wheels 244 and 246 to define areas of the tracks in the lower reach thereof about which the machine can be pivoted. Thus, the truck on the side towards which the turn is to be made is extended. This provides a pivot about which the machine can turn. This facilitates the steering of the machine, especially over hard packed and paved surfaces.

From the foregoing description, it will be apparent that there has been provided an improved system for harvesting of sweet corn which harvests the corn in the form of kernels ready for canning or other processing and allows the stalks, husks and cobs to be returned to the ground so that they do not have to be handled as a waste product. The system also lends itself to a compact machine of relatively light weight which can be transported either over the ground by being self-propelled or over highways and roads on a conventional flat-bed trailer. Variations and modifications and other applications and features of the invention as well as variations in the deign thereof, within the scope of the invention, will undoubtedly suggest themselves to these skilled in the art. Accordingly, the foregoing description should be taken as illustrative and not in a limiting sense.

I claim:

1. The method of harvesting kernels of corn on ears growing on stalks planted in parallel rows in a field, and returning husks, cobs and stalks to the field, said method comprising the steps of singularly for the ears growing in each of a plurality of rows and simultaneously for all of said plurality of rows removing said ears from said stalks, removing husks from said ears and removing kernels on each of said ears to leave cobs substantially empty of kernels so that the ears are distributed for kernel removal at a rate corresponding to the yield of corn from each of said rows individually, collecting said kernels from all said rows after removal thereof from said ears, and returning said husks, cobs and stalks to the field during said removing steps.

2. The method according to claim 1 further comprising the step of conveying said ears from said rows separately between spaced locations where said husk removal and kernel removal steps are carried out.

3. The method according to claim 2 further comprising carrying out said kernel removal step at a plurality of kernel cutting devices at different ones of said locations equal in number to said plurality of rows, and wherein said conveying step includes conveying husked ears from different ones of said rows separately to each of said locations of said cutting devices.

4. The method according to claim 3, wherein the husking step is carried out with the aid of a husking bed having husking rolls, depositing said ears from each of said rows on said bed, and separating said deposited ears from each of said rows in different ones of a plurality of lanes on said bed, said lanes including different ones of said rolls.

5. The method according to claim 4, wherein said conveying step includes the step of segregating ears from different ones of said lanes while conveying them to different ones of said plurality of cutting devices.

6. The method according to claim 5 further comprising the step of locating said cutting devices and said husking bed on upper and lower stories of a structure which travels through said field along said rows, said conveying step between said husking bed lanes and said cutting devices includes the step of vertically elevating the husked ears between said stories.

7. The method according to claim 6 wherein said elevating step of includes the step yieldably knocking over ears lying erect while being elevated to orient said cut ears so that they lie in the same generally horizontal direction.

8. The method according to claim 6 wherein said conveying step includes the step of conveying said ears upon removal from said stalks in bins upon which remnant stalks which accompany said ears lie, and ejecting said stalks while conveying said ears toward said husking bed.

9. The method according to claim 8 wherein said step of first conveying said ears upon removal from said stalks comprises the steps conveying said ears along generally parallel paths and then conveying said ears along inclined paths which align said ears from different ones of said rows with said lanes of said husking bed.

10. The method according to claim 9 wherein said first conveying step along said generally parallel paths includes said step of conveying said ears in said bins, and said stalk ejecting step is carried out in the vicinity of the confluence of each of said generally parallel and generally inclined paths.

11. The method according to claim 8 further comprising carrying out of said steps of removing said ears from said stalks and conveying said ears to said husking bed in an assembly pivotally mounted on said upper story with the forward end thereof facing the forward direction as the structure travels along said rows in said field.

12. The method according to claim 11 further comprising the step of self-propelling said structure on a tracked undercarriage.

13. The method according to claim 12 further comprising mounting said structure for pivotal movement about a first axis in the direction of travel thereof, and about second and third axes spaced from and perpendicular to said first axis, thereby providing a three point suspension upon which said structure is pivotally mounted to follow contours of said field.

14. The method according to claim 13 further comprising pivotally mounting said husking bed about an axis extending laterally with respect to said direction of travel, and pivoting said bed to maintain it at a predetermined inclination.

15. The method according to claim 1 wherein said collecting step is carried out with a container having a top, a floor, and end and side walls, by depositing said kernels to form a pile on said floor near one of said walls, detecting when said pile reaches a predetermined height, moving said floor an incremental distance toward the other said end walls to present an adjacent floor area for deposit of said kernels in a adjacent pile, and repeating said detecting and floor moving steps to generally, evenly fill said container.

16. The method according to claim 15 further comprising removing said kernels via a door in the other of said end walls.

17. A sweet corn harvesting machine which comprises an undercarriage, means mounted on said undercarriage supporting it for movement along rows of corn stalks in a field, a superstructure on said undercarriage providing a lower and an upper story, an assembly containing a corn ear removing head and means for conveying ears of corn removed by said head pivotally mounted on said superstructure and projecting forwardly therefrom, a husking bed mounted on said lower story for receiving said ears from said conveying means of said assembly, means for cutting kernels from husked ears of corn mounted on said upper story, means for elevating husked ears from said husking bed to said second story and to said kernel cutting means, means for collecting said kernels cut by said cutting means, and means for directing husks and cobs from which kernels are cut back on to the field.

18. The machine according to claim 17 further comprising means for selectively recycling ears from said cutting means back to said husking bed.

19. The machine in accordance with claim 17 further comprising tracks on said undercarriage, and motive means for driving said tracks to self-propelled said machine along said rows in said field.

20. The machine according to claim 19 wherein said undercarriage has parallel beams having opposite ends on which said tracks are mounted, said beams being pivotally connected to said undercarriage for movement about lateral axes near the forward end of said beams, a cross beam interconnecting said parallel beams near the opposite ends of said parallel means, said cross beam being pivotally mounted for movement about an axis perpendicular to said lateral axes.

21. The machine according to claim 19 further comprising wheels of opposite ends of said tracks, ground rollers rotatably mounted on said undercarriage between said wheels for supporting said tracks upon the ground, means for selectively extending at least said ground rollers along each of said tracks to provide an area of said tracks about which said machine can pivot on axes generally perpendicular to the ground to facilitate turning of said machine.

22. The machine according to claim 17 wherein said assembly includes a plurality of corn heads and said conveying means of said assembly includes first conveyors, means for separating stalks from ears associated with said first conveyors, second conveyors for receiving ears from said first conveyors at one end thereof and depositing said ears near one end of said husking bed, said one end of said husking bed being elevated with respect to an end of said bed opposite to said one end.

23. The machine according to claim 17 wherein said elevating means comprises a conveyor having an entry and a discharge end, said discharge end being curved to define a "J" shape with a convex surface, a plate curved complimentary to said convex surface and defining the floor extending to said discharge and, said conveyor having a plurality of links pivotally interlocked and having flights extending outwardly and teeth extending inwardly thereof, sprocket means engagable with said teeth for driving said conveyor to elevate ears from said husking bed received at entry end of said conveyor upwardly to said convex section where said ears are supported between said flights by said floor until discharged at said discharge end.

24. The machine according to claim 23 wherein a plurality of inclined flexural bars extend across said conveyor for directing any erect ones of said ears to lie along said flights.

25. The machine according to claim 24 further comprising a plurality of conveyors on said second story between said "J" shape elevator conveyor and each of said kernel cutting means to bring said ears thereto, a container on said second story, and the plurality of conveyors for bringing kernels produced by said cutting means to said container.

26. The machine according to claim 25 further comprising a moving belt providing the floor of said container, and means responsive to the height of said kernels deposited near one end of said container for driving said floor to move incrementally and present an adjacent area of said floor on which said kernels can be deposited.

27. Apparatus for harvesting kernels of corn on ears growing on stalks planted in parallel rows in a field, and returning husks, cobs and stalks to the field, said apparatus comprising means singularly for the ears growing in each of a plurality of rows and simultaneously for all of said plurality of rows for removing said ears from said stalks, removing husks from said ears and removing kernels on each of said ears to leave cobs substantially empty of kernels so that the ears are distributed for kernel removal at a rate corresponding to the yield of corn from each of said rows individually, means for collecting said kernels from all said rows after removal thereof from said ears, and means for returning said husks, cobs and stalks to the field during said removing steps.

28. The apparatus according to claim 27 further comprising separate devices for husk removal and for kernel removal disposed at locations spaced from each other, and means for conveying said ears from said rows separately between said spaced locations of said husk removal and kernel removal means.

29. The apparatus according to claim 28 further comprising a plurality of said kernel cutting devices at different ones of said locations equal in number to said plurality of rows, said conveying means including means for conveying husked ears separately from different ones of said rows separately to different ones of said locations of said cutting devices.

30. The apparatus according to claim 29, wherein the husk removal device comprises a husking bed having husking rolls, and means for depositing said ears from each of said rows on said bed, and means for separating said deposited ears from each of said rows in different ones of a plurality of lanes on said bed, said lanes including different groups of said rolls.

31. The apparatus according to claim 30, wherein said conveying means includes means for segregating ears from different ones of said lanes while conveying them to different ones of said plurality of cutting devices.

32. The apparatus according to claim 31 further comprising a structure which travels through the field having upper and lower stories, means for locating said cutting device and said husking bed on said upper and lower stories of said structure, said conveying means between said husking bed lanes and said cutting devices including means for vertically elevating the husked ears between said stories.

33. The apparatus according to claim 32 wherein said elevating means includes means for orienting said ears so that they lie horizontally in the same direction.

34. The apparatus according to claim 32 wherein said conveying means includes a conveyor having successive bins, means for conveying said ears upon removal from said stalks in said bins such that remnant stalks which accompany said ears overlie said bins, and means for ejecting said stalks while conveying said ears toward said husking bed.

35. The apparatus according to claim 34 wherein said means for conveying said ears upon removal from said stalks comprises means for conveying said ears along generally parallel paths and then conveying said ears along inclined paths which align said ears from different ones of said rows with said lanes of said husking bed.

36. The apparatus according to claim 35 wherein said means for conveying step along said generally parallel paths includes said means for conveying said ears in said bins, and said stalk ejecting means is disposed in the vicinity of the confluence of each of said generally parallel and generally inclined paths.

37. The apparatus according to claim 34 wherein said devices for removing said ears from said stalks and said means for conveying said ears to said husking bed are part of an assembly pivotally mounted on said upper story with the forward end thereof facing the forward direction as the structure travels along said rows in said field.

38. The apparatus according to claim 37 further comprising a tracked undercarriage, and means for self-propelling said structure carried on said undercarriage.

39. The apparatus according to claim 38 further comprising means for mounting said structure on said undercarriage for pivotal movement about a first axis in the direction of travel thereof, and about second and third axes spaced from and perpendicular to said first axis, thereby providing a three point suspension upon which said structure is pivotally mounted to follow contours of said field.

40. The apparatus according to claim 39 further comprising means for pivotally mounting said husking bed about an axis extending laterally with respect to said direction of travel, and means for pivoting said bed for maintaining it at a predetermined inclination.

* * * * *